United States Patent
Kang et al.

(10) Patent No.: US 12,506,413 B2
(45) Date of Patent: Dec. 23, 2025

(54) VOLTAGE CONVERSION APPARATUS, CONTROL METHOD, AND POWER SUPPLY DEVICE

(71) Applicant: Huawei Digital Power Technologies Co., Ltd., Shenzhen (CN)

(72) Inventors: Liangyun Kang, Shenzhen (CN); Ken Chin, Shenzhen (CN); Bo Wang, Shenzhen (CN); Baolei Dai, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 328 days.

(21) Appl. No.: 18/451,178

(22) Filed: Aug. 17, 2023

(65) Prior Publication Data

US 2024/0088792 A1      Mar. 14, 2024

(30) Foreign Application Priority Data

Sep. 2, 2022   (CN) .......................... 202211075072.3

(51) Int. Cl.
  *H02M 3/335*    (2006.01)
  *H02M 1/00*     (2006.01)

(52) U.S. Cl.
  CPC ..... *H02M 3/33523* (2013.01); *H02M 1/0058* (2021.05); *H02M 3/33571* (2021.05)

(58) Field of Classification Search
  CPC .......... H02M 3/33571; H02M 1/0016; H02M 1/083; H02M 3/01
  See application file for complete search history.

(56) References Cited

U.S. PATENT DOCUMENTS

| | | | |
|---|---|---|---|
| 12,009,753 B2* | 6/2024 | Yang | H02M 3/33571 |
| 12,057,777 B2* | 8/2024 | Xu | H02M 3/33523 |
| 2022/0085715 A1 | 3/2022 | Su et al. | |
| 2024/0088792 A1* | 3/2024 | Kang | H02M 1/083 |

FOREIGN PATENT DOCUMENTS

| | | |
|---|---|---|
| CN | 111697811 A | 9/2020 |
| CN | 113937988 A | 1/2022 |

* cited by examiner

*Primary Examiner* — Kyle J Moody
(74) *Attorney, Agent, or Firm* — Maier & Maier, PLLC

(57) ABSTRACT

A voltage conversion apparatus, a control method, and a power supply device. The voltage conversion apparatus includes a control circuit. The control circuit is configured to: obtain a first sampling voltage and a second sampling voltage; detect a resonant period based on the second sampling voltage when it is determined, based on the first sampling voltage, that a voltage range of an output voltage of the voltage conversion apparatus changes and a voltage threshold is exceeded; and output a drive signal based on the detected resonant period. The drive signal is used to control turn-on and turn-off of a first switching transistor and a second switching transistor.

15 Claims, 10 Drawing Sheets

VOLTAGE CONVERSION APPARATUS, CONTROL METHOD, AND POWER SUPPLY DEVICE

CROSS-REFERENCE TO RELATED APPLICATION

This application claims priority to Chinese Patent Application No. 202211075072.3, filed on Sep. 2, 2022, which is hereby incorporated by reference in its entirety.

TECHNICAL FIELD

The embodiments relate to the circuit field, a voltage conversion apparatus, a control method, and a power supply device.

BACKGROUND

Direct current-to-direct current (DC-DC) voltage converters are often used in voltage conversion apparatuses such as mobile phone adapters and laptop adapters. An asymmetrical half-bridge (AHB) flyback conversion circuit is often used in the DC-DC voltage converter to implement a wide-range output.

The AHB flyback conversion circuit may include a main power transistor, an auxiliary power transistor, a transformer, a resonant capacitor, a resonant inductor, and the like. Parasitic capacitors, resonant capacitors, and resonant inductors of the main power transistor and the auxiliary power transistor, and an excitation inductor on a primary side of the transformer resonate together. However, the parasitic capacitors of the main power transistor and the auxiliary power transistor may change as an output voltage changes. In this case, a resonance parameter (for example, a resonant period) of the AHB flyback conversion circuit also changes. When the resonance parameter cannot be adaptively detected and updated, the main power transistor and the auxiliary power transistor are not properly controlled, affecting conversion efficiency of the voltage converter.

SUMMARY

In view of this, the embodiments may provide a voltage conversion apparatus, a control method, and a power supply device. A change of a direct current output voltage is monitored, and a resonant period is adaptively detected and updated, so that conversion efficiency of the voltage conversion apparatus is improved under a wide-range output.

According to a first aspect, the embodiments may provide a voltage conversion apparatus. The voltage conversion apparatus has a resonant period and includes an asymmetrical half-bridge conversion unit and a control circuit. The asymmetrical half-bridge conversion unit includes a first switching transistor and a second switching transistor. The control circuit is configured to: obtain a first sampling voltage and a second sampling voltage; detect the resonant period based on the second sampling voltage when it is determined, based on the first sampling voltage, that a voltage range of an output voltage of the voltage conversion apparatus changes; and output a drive signal based on the detected resonant period. The drive signal is used to control turn-on and turn-off of the first switching transistor and the second switching transistor.

It may be understood that a change of the output voltage is monitored based on the obtained first sampling voltage and the obtained second sampling voltage, so that the resonant period of the voltage conversion apparatus is adaptively detected and updated. In this way, the drive signal is adjusted based on the updated resonant period, so that conversion efficiency of the voltage conversion apparatus is improved under a wide-range output.

With reference to the first aspect, in a possible implementation, the control circuit includes a sampling and holding unit, a voltage grouping unit, and a control unit. The sampling and holding unit may be configured to sample and hold the first sampling voltage and output a sampling signal. The voltage grouping unit is configured to receive the sampling signal and generate a first enable signal when it is determined, based on the sampling signal, that the voltage range of the output voltage changes. The control unit is configured to determine, based on the first enable signal, that the voltage range of the output voltage changes.

It may be understood that the sampling and holding unit is disposed to receive a first sampling signal, and the voltage grouping unit is used to group sampling signals output by the sampling and holding unit, to include the sampling signals into different voltage ranges, thereby monitoring the change of the output voltage of the voltage conversion apparatus.

With reference to the first aspect, in a possible implementation, the control circuit includes a threshold timing unit. The threshold timing unit is configured to obtain the second sampling voltage, and determine the resonant period based on the second sampling voltage when the control unit determines that the voltage range of the output voltage changes.

With reference to the first aspect, in a possible implementation, the threshold timing unit includes a comparator and a timer. The comparator is configured to obtain the second sampling voltage and a reference voltage and output a comparison signal. The timer is configured to determine the resonant period based on a period of the comparison signal.

It may be understood that the change of the output voltage reflects the resonant period of the voltage conversion apparatus and the second sampling voltage represents the change of the output voltage. Therefore, the comparator is disposed and the second sampling voltage is compared with the reference voltage, to convert a second reference voltage into a comparison signal. Then, a signal period of the comparison signal is obtained to determine a period of the output voltage, so that the resonant period of the voltage conversion apparatus is obtained.

With reference to the first aspect, in a possible implementation, the voltage conversion apparatus includes a first mode and a second mode. The first mode is a continuous resonance current mode. The second mode is a discontinuous resonance current mode. The second mode includes a continuous control state and a discontinuous control state. In the discontinuous control state, both the first switching transistor and the second switching transistor are in a turn-off state. The voltage conversion apparatus includes an output voltage collection unit. The output voltage collection unit is configured to receive the output voltage and output a feedback voltage. The control unit is configured to: obtain the feedback voltage; determine, based on the feedback voltage, that the voltage conversion apparatus is in the first mode or in the second mode; control the first switching transistor and the second switching transistor to be turned off and obtain the resonant period based on the second sampling voltage, when it is determined that the voltage conversion apparatus is in the first mode and the voltage range of the output voltage changes; and obtain the resonant period based on the second sampling voltage when it is determined that the voltage conversion apparatus is in the second mode and the voltage range of the output voltage changes, and the voltage conversion apparatus is switched from the continuous control state to the discontinuous control state.

It may be understood that determining the resonant period requires that the voltage conversion apparatus may be in a free resonant state. The voltage conversion apparatus has different working modes. In the first mode, the first switching transistor and the second switching transistor need to be turned off, so that the voltage conversion apparatus enters the free resonant state. In the second mode, it is only required to wait for detection of the resonant period in the discontinuous control state, without turning off the first switching transistor and the second switching transistor. Different policies are used in the different modes to detect the resonant period, so that detection efficiency of the resonant period is improved.

With reference to the first aspect, in a possible implementation, the asymmetrical half-bridge conversion unit includes a transformer. The transformer includes a primary winding and a secondary winding. The second sampling voltage is a voltage at two terminals of one of the primary winding and the secondary winding.

With reference to the first aspect, in a possible implementation, the transformer includes an auxiliary winding. The auxiliary winding is coupled to the primary winding. The second sampling voltage is a voltage at two terminals of the auxiliary winding.

With reference to the first aspect, in a possible implementation, the first sampling voltage and the second sampling voltage are a same voltage.

With reference to the first aspect, in a possible implementation, the asymmetrical half-bridge conversion unit includes a resonant capacitor. The first sampling voltage is a voltage at two terminals of the resonant capacitor.

With reference to the first aspect, in a possible implementation, the voltage conversion apparatus includes an isolation sampling unit. The isolation sampling unit is configured to receive the output voltage. The first sampling voltage is a voltage output by the isolation sampling unit.

It may be understood that both the first sampling voltage and the second sampling voltage represent a change of an output voltage of the voltage conversion apparatus. Therefore, the first sampling voltage and the second sampling voltage may be the same or different, and may be a voltage on the primary winding, the secondary winding, or the auxiliary winding, or may be a voltage at two terminals of the resonant capacitor or may be an output voltage.

According to a second aspect, the embodiments may further provide a control circuit. The control circuit is applied to a voltage conversion apparatus. The voltage conversion apparatus has a resonant period and includes an asymmetrical half-bridge conversion unit and the control circuit. The asymmetrical half-bridge conversion unit includes a first switching transistor and a second switching transistor. The control circuit is configured to: obtain a first sampling voltage and a second sampling voltage; detect the resonant period based on the second sampling voltage when it is determined, based on the first sampling voltage, that a voltage range of an output voltage of the voltage conversion apparatus changes; and output a drive signal based on the detected resonant period. The drive signal is used to control turn-on and turn-off of the first switching transistor and the second switching transistor.

With reference to the second aspect, in a possible implementation, the control circuit includes a sampling and holding unit, a voltage grouping unit, and a control unit. The sampling and holding unit may be configured to sample and hold the first sampling voltage and output a sampling signal. The voltage grouping unit is configured to receive the sampling signal and generate a first enable signal when it is determined, based on the sampling signal, that the voltage range of the output voltage changes. The control unit is configured to determine, based on the first enable signal, that the voltage range of the output voltage changes.

With reference to the second aspect, in a possible implementation, the control circuit includes a threshold timing unit. The threshold timing unit is configured to obtain the second sampling voltage, and determine the resonant period based on the second sampling voltage when the control unit determines that the voltage range of the output voltage changes.

With reference to the second aspect, in a possible implementation, the threshold timing unit includes a comparator and a timer. The comparator is configured to obtain the second sampling voltage and a reference voltage and output a comparison signal. The timer is configured to determine the resonant period based on a period of the comparison signal.

With reference to the second aspect, in a possible implementation, the voltage conversion apparatus includes a first mode and a second mode. The first mode is a continuous resonance current mode. The second mode is a discontinuous resonance current mode. The second mode includes a continuous control state and a discontinuous control state. In the discontinuous control state, both the first switching transistor and the second switching transistor are in a turn-off state. The voltage conversion apparatus includes an output voltage collection unit. The output voltage collection unit is configured to receive the output voltage and output a feedback voltage. The control unit is configured to: obtain the feedback voltage; determine, based on the feedback voltage, that the voltage conversion apparatus is in the first mode or in the second mode; control the first switching transistor and the second switching transistor to be turned off and obtain the resonant period based on the second sampling voltage, when it is determined that the voltage conversion apparatus is in the first mode and the voltage range of the output voltage changes; and obtain the resonant period based on the second sampling voltage when it is determined that the voltage conversion apparatus is in the second mode and the voltage range of the output voltage changes, and the voltage conversion apparatus is switched from the continuous control state to the discontinuous control state.

According to a third aspect, the embodiments may further provide a control method of a voltage conversion apparatus. The voltage conversion apparatus has a resonant period and includes an asymmetrical half-bridge conversion unit and a control circuit. The asymmetrical half-bridge conversion unit includes a first switching transistor and a second switching transistor. The method includes: obtaining a first sampling voltage and a second sampling voltage; detecting the resonant period based on the second sampling voltage when it is determined, based on the first sampling voltage, that a voltage range of an output voltage of the voltage conversion apparatus changes; and outputting a drive signal based on the detected resonant period. The drive signal is used to control turn-on and turn-off of the first switching transistor and the second switching transistor.

With reference to the third aspect, in a possible implementation, the method includes: sampling and holding the first sampling voltage, and outputting a sampling signal; receiving the sampling signal, and generating a first enable signal when it is determined, based on the sampling signal, that the voltage range of the output voltage changes; and determining, based on the first enable signal, that the voltage range of the output voltage changes.

With reference to the third aspect, in a possible implementation, the method includes: obtaining the second sampling voltage and a reference voltage and outputting a comparison signal; and determining the resonant period based on a period of the comparison signal.

With reference to the third aspect, in a possible implementation, the voltage conversion apparatus includes a first mode and a second mode. The first mode is a continuous resonance current mode. The second mode is a discontinuous resonance current mode. The second mode includes a continuous control state and a discontinuous control state. In the discontinuous control state, both the first switching transistor and the second switching transistor are in a turn-off state. The voltage conversion apparatus includes an output voltage collection unit. The output voltage collection unit is configured to receive the output voltage and output a feedback voltage. The method includes: obtaining the feedback voltage; determining, based on the feedback voltage, that the voltage conversion apparatus is in the first mode or in the second mode; controlling the first switching transistor and the second switching transistor to be turned off and obtaining the resonant period based on the second sampling voltage, when it is determined that the voltage conversion apparatus is in the first mode and the voltage range of the output voltage changes; and obtaining the resonant period based on the second sampling voltage when it is determined that the voltage conversion apparatus is in the second mode, the voltage range of the output voltage changes, and the voltage conversion apparatus is switched from the continuous control state to the discontinuous control state.

According to a fourth aspect, the embodiments may further provide a power supply device. The power supply device includes: an alternating current-direct current (AC-DC) voltage conversion unit, configured to convert an alternating current voltage into a direct current input voltage; and a voltage conversion apparatus, configured to receive the direct current input voltage output by the AC-DC voltage conversion unit, and output a direct current output voltage after direct current voltage conversion. The voltage conversion apparatus has a resonant period and includes an asymmetrical half-bridge conversion unit and a control circuit. The asymmetrical half-bridge conversion unit includes a first switching transistor and a second switching transistor. The control circuit is configured to: obtain a first sampling voltage and a second sampling voltage; detect the resonant period based on the second sampling voltage when it is determined, based on the first sampling voltage, that a voltage range of an output voltage of the voltage conversion apparatus changes; and output a drive signal based on the detected resonant period. The drive signal is used to control turn-on and turn-off of the first switching transistor and the second switching transistor.

In addition, for effects brought by any possible implementation in the second to the fourth aspects, refer to effects brought by different implementations in the first aspect. Details are not described herein again.

DETAILED DESCRIPTION OF THE EMBODIMENTS

The following describes the embodiments with reference to the accompanying drawings.

In the embodiments, a voltage conversion apparatus includes, but is not limited to, a power supply device, such as a power adapter, an industrial power supply, a space power supply, a charger, and a mobile power supply of a terminal device.

Direct current-to-direct current (DC-DC) voltage converters may be used in voltage conversion apparatuses. An asymmetrical half-bridge (AHB) flyback conversion circuit may be used in the DC-DC voltage converter to implement a wide-range output.

Figure 1A:
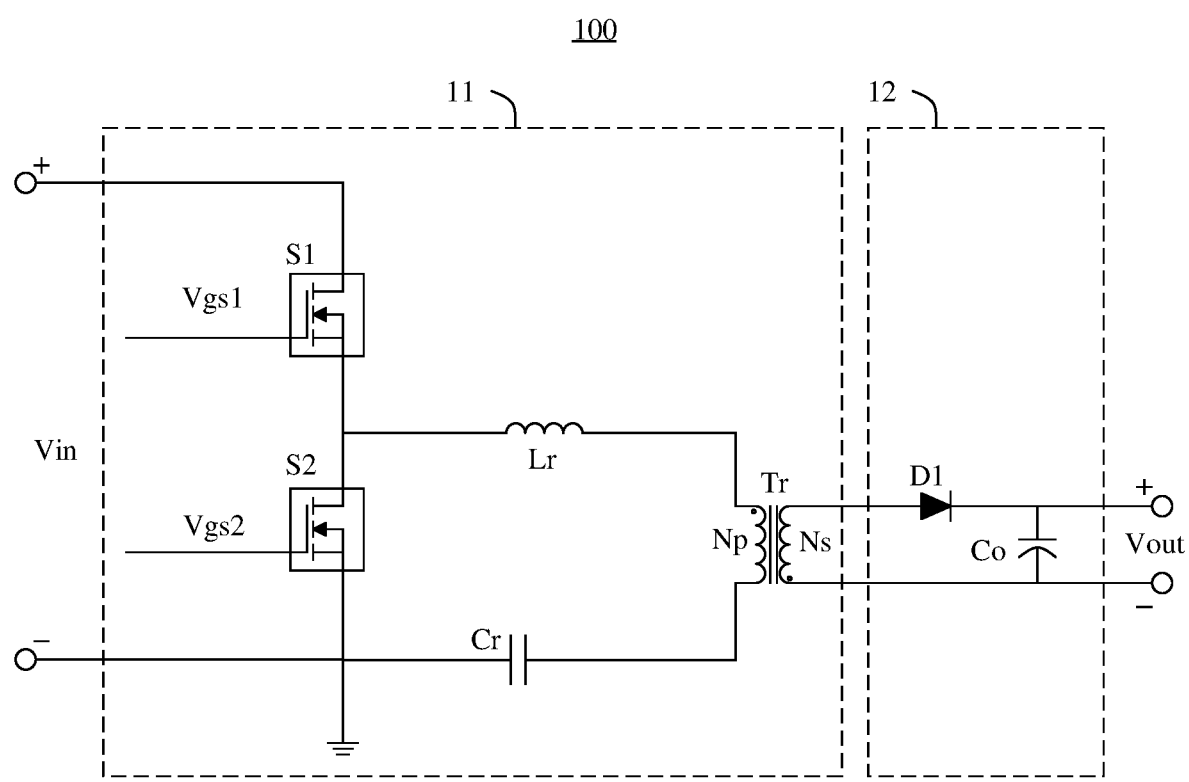
FIG. 1A is a schematic diagram of a structure of an asymmetrical half-bridge conversion unit according to an embodiment.

For example, FIG. 1A is a schematic diagram of an asymmetrical half-bridge conversion unit 100 according to an embodiment. In this embodiment, the asymmetrical half-bridge conversion unit 100 may be, for example, a DC-DC voltage converter, and is configured to output a direct current output voltage after resonance conversion is performed on a received direct current input voltage.

As shown in FIG. 1A, the asymmetrical half-bridge conversion unit 100 includes an AHB flyback conversion circuit 11 and a rectifier and filter circuit 12. The AHB flyback conversion circuit 11 includes a first switching transistor S1, a first switching transistor S2, a transformer Tr, a resonant inductor Lr, and a resonant capacitor Cr. An excitation inductor on a primary side of the transformer Tr is represented as Lm (not shown in the figure).

The AHB flyback conversion circuit 11 is configured to receive a direct current input voltage Vin. In the AHB flyback conversion circuit 11, the first switching transistor S1 and the second switching transistor S2 are connected in series. In some embodiments, the first switching transistor S1 and the second switching transistor S2 may be a field-effect transistor (FET) made of a material, such as a semiconductor material, silicon (Si), or a third-generation wide-bandgap semiconductor material, silicon carbide (SiC) or gallium nitride (GaN).

For example, a drain of the first switching transistor S1 receives the direct current input voltage Vin, a source of the first switching transistor S1 is connected to a drain of the second switching transistor S2, and a source of the second switching transistor S2 is connected to ground. A gate of the first switching transistor S1 receives a first drive signal Vgs1 from a control circuit (not shown in the figure), and a gate of the second switching transistor S2 receives a second drive signal Vgs2 from the control circuit. The first switching transistor S1 and the second switching transistor S2 can be turned on or turned off under driving of the first drive signal Vgs1 and the second drive signal Vgs2.

The transformer Tr includes a primary winding Np and a secondary winding Ns. The primary winding Np and the secondary winding Ns of the transformer Tr are coupled by using a magnetic core. The primary winding Np of the transformer Tr is connected in parallel between the source and the drain of the second switching transistor S2 by using the resonant capacitor Cr and the resonant inductor Lr. A dotted terminal of the primary winding Np may be connected to a first terminal of the resonant inductor Lr. A second terminal of the resonant inductor Lr is connected to the source of the first switching transistor S1 and the drain of the second switching transistor S2. An undotted terminal of the primary winding Np is connected to a first terminal of the resonant capacitor Cr, and a second terminal of the resonant capacitor Cr is connected to the source of the second switching transistor S2. The secondary winding Ns of the transformer Tr passes through the rectifier and filter circuit 12 to obtain a direct current output voltage Vout.

It may be understood that, in this embodiment, the resonant inductor Lr includes a leakage inductor of the transformer Tr, and an external inductor. Further, in other embodiments, the resonant inductor Lr may also be completely integrated in the transformer Tr.

The rectifier and filter circuit 12 is configured to receive power supplied by the transformer Tr in the AHB flyback conversion circuit 11 and output the direct current output voltage Vout to supply power to a load. That is, the AHB flyback conversion circuit 11 supplies power to the load by using the rectifier and filter circuit 12.

In a possible implementation, the rectifier and filter circuit 12 includes a rectifier diode D1 and an output capacitor Co. An anode of the rectifier diode D1 is connected to an undotted terminal of the secondary winding Ns, and a cathode of the rectifier diode D1 is connected to a first terminal of the output capacitor Co. A second terminal of the output capacitor Co is connected to a dotted terminal of the secondary winding Ns.

Figure 1B:
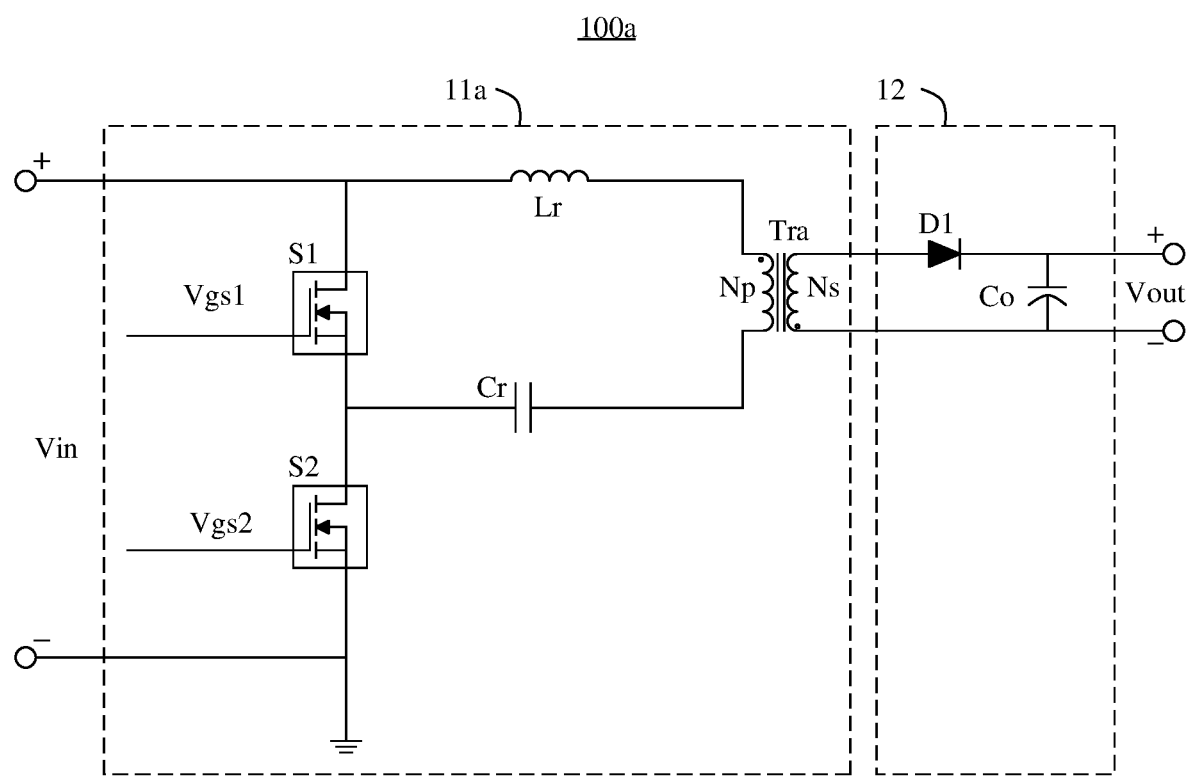
FIG. 1B is a schematic diagram of a structure of an asymmetrical half-bridge conversion unit according to an embodiment.

For another example, FIG. 1B is a schematic diagram of an asymmetrical half-bridge conversion unit 100a according to another embodiment. As shown in FIG. 1B, the asymmetrical half-bridge conversion unit 100a includes an AHB flyback conversion circuit 11a and a rectifier and filter circuit 12. The AHB flyback conversion circuit 11a includes a first switching transistor S1, a first switching transistor S2, a transformer Tra, a resonant inductor Lr, and a resonant capacitor Cr. The rectifier and filter circuit 12 includes a rectifier diode D1 and an output capacitor Co.

It may be understood that, in the embodiment shown in FIG. 1B, a difference between the asymmetrical half-bridge conversion unit 100a and the asymmetrical half-bridge conversion unit 100 lies in that the transformer Tra and the first switching transistor S1 in the AHB flyback conversion circuit 11a are connected in a different manner.

As shown in FIG. 1B, a primary winding Np of the transformer Tra is connected in parallel between a source and a drain of the first switching transistor S1 by using the resonant capacitor Cr and the resonant inductor Lr.

It may be understood that, as shown in FIG. 1A and FIG. 1B, the asymmetrical half-bridge conversion unit 100/100a may adjust a switching frequency of the first switching transistor S1 and the second switching transistor S2, to adjust the direct current output voltage Vout. In addition, as shown in FIG. 1A and FIG. 1B, the resonant inductor Lr of the asymmetrical half-bridge conversion unit 100/100a, the excitation inductor Lm of the transformer Tr, the resonant capacitor Cr, and parasitic capacitors (not shown in the figures) of the first switching transistor S1 and the second switching transistor S2 resonate together. However, as the direct current output voltage Vout changes, a resonant component (for example, a resonant capacitor C1, a parasitic capacitor of the first switching transistor S1, and a parasitic capacitor of the second switching transistor S2) changes. This change causes a change of a resonance parameter (for example, a resonant period) of the asymmetrical half-bridge conversion unit 100/100a. However, if drive signals (for example, Vgs1 and Vgs2) of the first switching transistor S1 and the second switching transistor S2 are determined based on a same resonance parameter at different output voltages, the first switching transistor S1 and the second switching transistor S2 are not properly controlled, further affecting voltage conversion efficiency of the asymmetrical half-bridge conversion unit 100/100a.

To resolve the foregoing problem, an embodiment may provide a voltage conversion apparatus. The voltage conversion apparatus includes a control circuit and an asymmetrical half-bridge conversion unit. The control circuit is configured to: monitor a change of an output voltage of the asymmetrical half-bridge conversion unit, adaptively detect and update a resonant period of the asymmetrical half-bridge conversion unit, and then adjust a drive signal based on the updated resonant period, so that conversion efficiency of the voltage conversion apparatus is improved.

The following describes in detail a circuit structure and a working principle of a voltage conversion apparatus according to Embodiment 1 to Embodiment 3.

Embodiment 1

Figure 2:
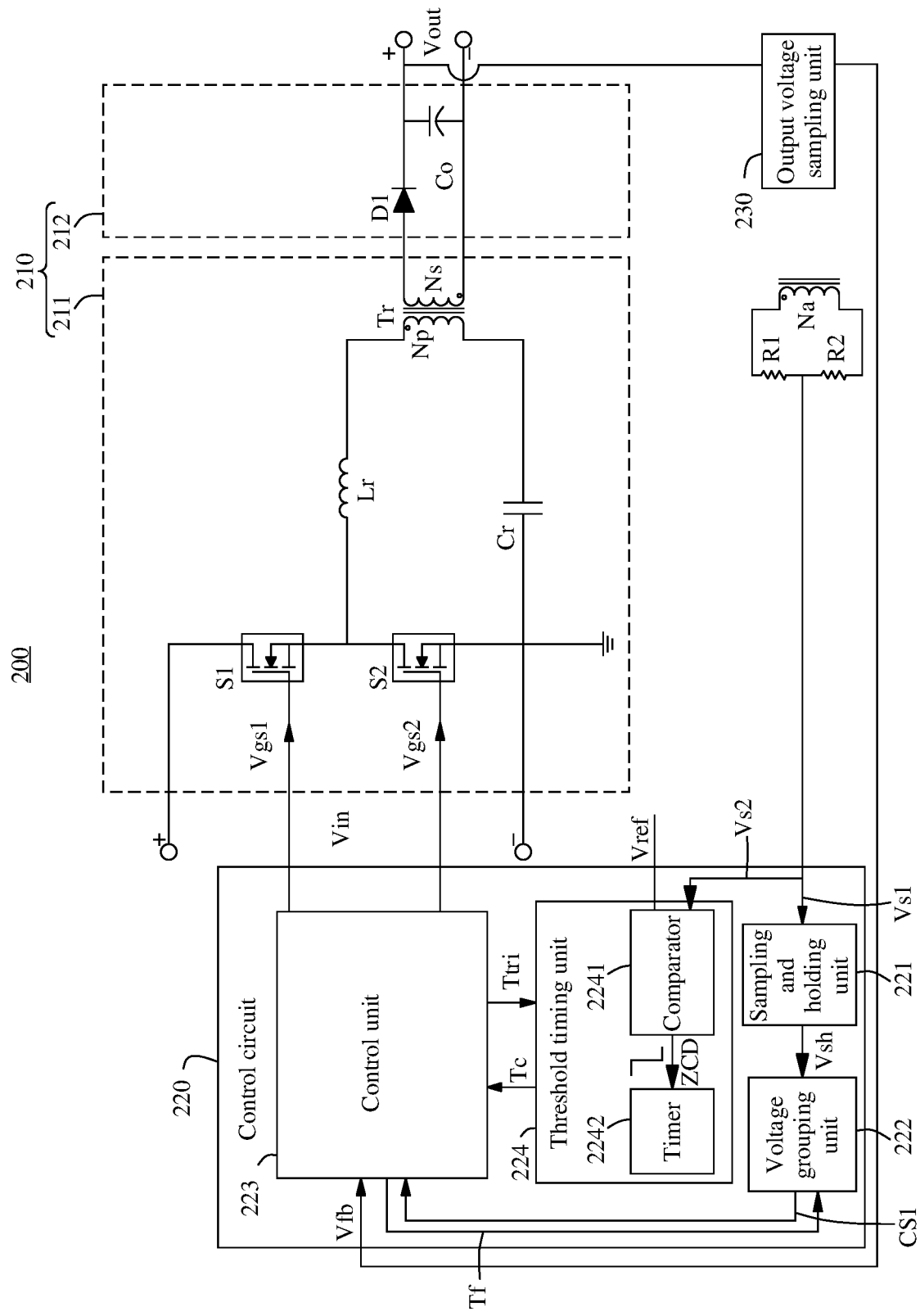
FIG. 2 is a schematic diagram of a structure of a voltage conversion apparatus according to Embodiment 1.

FIG. 2 is a schematic diagram of a structure of a voltage conversion apparatus 200 according to Embodiment 1.

As shown in FIG. 2, the voltage conversion apparatus 200 includes an asymmetrical half-bridge conversion unit 210 and a control circuit 220. The asymmetrical half-bridge conversion unit 210 is configured to convert a received direct current input voltage Vin and output a direct current output voltage Vout. The asymmetrical half-bridge conversion unit 210 includes an AHB flyback conversion circuit 211 and a rectifier and filter circuit 212. The AHB flyback conversion circuit 211 is configured to couple the direct current input voltage Vin from a primary side of a transformer Tr to a secondary side. The rectifier and filter circuit 212 is configured to convert an alternating current voltage coupled to the secondary side of the transformer Tr into a direct current voltage and output the direct current voltage as the direct current output voltage Vout.

It may be understood that, in this embodiment, the circuit structure and the working principle of the asymmetrical half-bridge conversion unit 210 are similar to those of the asymmetrical half-bridge conversion unit 100/100a described in FIG. 1A and FIG. 1B. Details are not described herein again. For ease of description, the following uses an example in which the asymmetrical half-bridge conversion unit 210 is the asymmetrical half-bridge conversion unit 100 in FIG. 1A.

It may be understood that, in this embodiment, the control circuit 220 is configured to:

obtain a first sampling voltage Vs1 and a second sampling voltage Vs2.

It may be understood that both the first sampling voltage Vs1 and the second sampling voltage Vs2 each are in a linear relationship with the direct current output voltage Vout. Therefore, changes of the first sampling voltage Vs1 and the second sampling voltage Vs2 represent a change of the direct current output voltage Vout.

It may be understood that, in this embodiment, the control circuit 220 is further configured to:

determine, based on the first sampling voltage Vs1, whether the direct current output voltage Vout of the voltage conversion apparatus 200 changes; and when the direct current output voltage Vout changes, detect a resonant period based on the second sampling voltage Vs2.

When the resonant period needs to be detected may be determined by using the first sampling voltage Vs1, and the resonant period is detected by using the second sampling voltage Vs2.

In a possible implementation, when a voltage range of the direct current output voltage Vout changes, the resonant period is detected based on the second sampling voltage Vs2.

It may be understood that, in this embodiment, the control circuit 220 is further configured to:

output drive signals, for example, a first drive signal Vgs1 and a second drive signal Vgs2, based on the detected resonant period, to control turn-on and turn-off of a first switching transistor S1 and a second switching transistor S2.

The control circuit 220 can monitor a change of the direct current output voltage Vout of the voltage conversion apparatus 200 based on the obtained first sampling voltage Vs1 and the obtained second sampling voltage Vs2, for example, monitor the voltage range of the direct current output voltage Vout, and can adaptively detect and update the resonant period of the voltage conversion apparatus 200. In this way, the drive signal is adjusted based on the updated resonant period, so that conversion efficiency of the voltage conversion apparatus 200 is improved under a wide-range output.

As shown in FIG. 2, the voltage conversion apparatus 200 includes an output voltage sampling unit 230. The output voltage sampling unit 230 is connected to the rectifier and filter circuit 212 and the control circuit 220. The output voltage sampling unit 230 is configured to sample the direct current output voltage Vout of the asymmetrical half-bridge conversion unit 210 and output a feedback voltage Vfb to the control circuit 220.

It may be understood that the feedback voltage Vfb is in a linear relationship with the direct current output voltage Vout. Therefore, a change of the feedback voltage Vfb represents a change of the direct current output voltage Vout.

It may be understood that the voltage conversion apparatus 200 includes two modes: a first mode and a second mode. The first mode is a continuous resonance current mode or a heavy-load mode. The second mode is a discontinuous resonance current mode or a light-load mode.

In the first mode, due to relatively heavy load, the first switching transistor S1 and the second switching transistor S2 need to be continuously and alternately turned on, that is, in a continuous switching state, so that the voltage conversion apparatus 200 can continuously provide a converted direct current voltage to a load.

In the second mode, due to relatively light load, the first switching transistor S1 and the second switching transistor S2 can be alternately turned on in a period of time, turned off at the same time in a next period of time, and then alternately turned on in another next period of time, and so on. A state in a time period in which the first switching transistor S1 and the second switching transistor S2 are alternately turned on is referred to as a continuous control state, and a state in a time period in which the first switching transistor S1 and the second switching transistor S2 are turned off at the same time is referred to as a discontinuous control state. A moment when the continuous control state is switched to the discontinuous control state, such as the moment when the first switching transistor S1 and the second switching transistor S2 are turned off at the same time, is referred to as a discontinuous moment.

Accordingly, in this embodiment, whether a working mode of the voltage conversion apparatus 200 is the first mode or the second mode may be determined by using the feedback voltage Vfb. For example, when the feedback voltage Vfb is greater than or equal to a preset mode switching threshold, it may be determined that the voltage conversion apparatus 200 is in the first mode. For another example, when the feedback voltage Vfb is less than the preset mode switching threshold, it may be determined that the voltage conversion apparatus 200 is in the second mode. It may be understood that the preset mode switching threshold is a voltage value.

As shown in FIG. 2, in some embodiments, the voltage conversion apparatus 200 further includes an auxiliary winding Na, a first resistor R1, and a second resistor R2. The auxiliary winding Na is coupled to a primary winding Np of the transformer Tr by using a magnetic core. The first resistor R1 and the second resistor R2 are connected in series at two terminals of the auxiliary winding Na. For example, a first terminal of the first resistor R1 is connected to a dotted terminal of the auxiliary winding Na, a first terminal of the second resistor R2 is connected to a second terminal of the second resistor R1, and a second terminal of the second resistor R2 is connected to an undotted terminal of the auxiliary winding Na. A connection node of the first resistor R1 and the second resistor R2 is connected to the control circuit 220 and is configured to output the first sampling voltage Vs1 and the second sampling voltage Vs2. In other words, in this embodiment, the first sampling voltage Vs1 is the same as the second sampling voltage Vs2. Additionally, based on a working principle of the transformer Tr, it may be known that a voltage at two terminals of the primary winding Np, a voltage at two terminals of a secondary winding Ns, and a voltage at the two terminals of the auxiliary winding Na in the transformer Tr have a proportional relationship with each other. Further, in some embodiments, the first sampling voltage Vs1 or the second sampling voltage Vs2 may be a voltage at two terminals of any winding in the transformer Tr.

It may be understood that, as described above, the voltage at the two terminals of the auxiliary winding Na may be sampled by the control circuit 220 after being divided by the first resistor R1 and the second resistor R2. Also, in some other embodiments, the control circuit 220 may also directly sample the voltage at the two terminals of the auxiliary winding Na.

As shown in FIG. 2, the control circuit 220 includes a sampling and holding unit 221, a voltage grouping unit 222, a control unit 223, and a threshold timing unit 224.

A first terminal of the sampling and holding unit 221 is connected between the first resistor R1 and the second resistor R2 and is configured to receive and hold the first sampling voltage Vs1, and then output a sampling signal Vsh.

In this embodiment, the voltage grouping unit 222 may be, for example, a hysteresis comparator, and a structure of the voltage grouping unit 222 is not limited herein. As shown in FIG. 2, a first terminal of the voltage grouping unit 222 is connected to a second terminal of the sampling and holding unit 221, and is configured to receive the sampling signal Vsh, and group the sampling signal Vsh to determine a level of the direct current output voltage Vout. A second terminal of the voltage grouping unit 222 is connected to the control unit 223. It may be understood that the voltage grouping unit 222 is configured to receive the sampling signal Vsh and generate a first enable signal CS1 to the control unit 223 when it is determined, based on the sampling signal Vsh, that the level of the direct current output voltage Vout changes.

Figure 3:
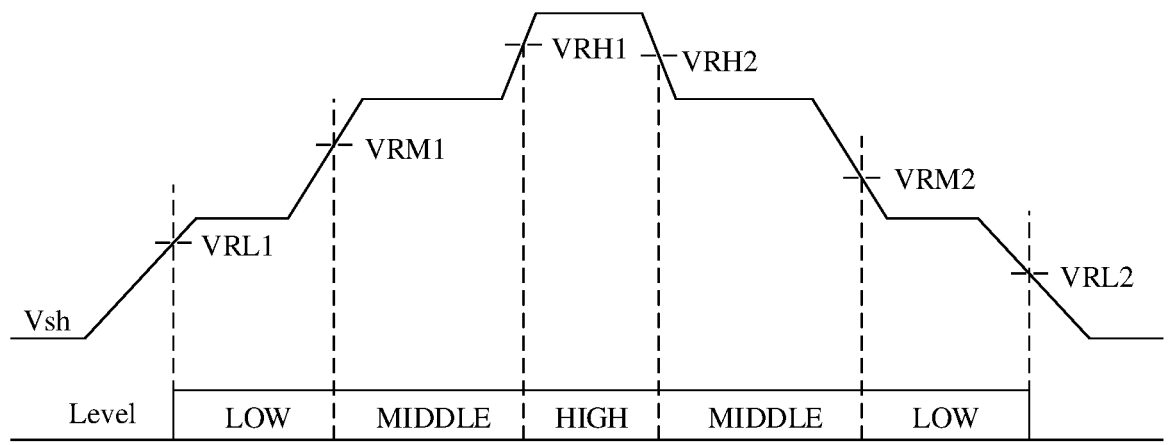
FIG. 3 is a schematic diagram of output voltage levels of a voltage grouping unit in the voltage conversion apparatus shown in FIG. 2.

FIG. 3 is a schematic diagram of levels of the direct current output voltage Vout that are determined by the voltage grouping unit 222. It may be understood that, in this embodiment, a voltage level of each direct current output voltage Vout has at least one voltage range. When the voltage range of the direct current output voltage Vout changes, a voltage level is switched accordingly.

For example, when the direct current output voltage Vout has two voltage ranges from 5 V to 9 V and from 9 V to 12 V, and the direct current output voltage Vout is stable at any voltage value in the voltage range from 5 V to 9 V, or a fluctuation range of the direct current output voltage Vout is within the voltage range from 5 V to 9 V, the voltage range does not change and the resonant period does not need to be detected. However, when the direct current output voltage Vout changes from a voltage value from 5 V to 9 V, for example, 8 V, to a voltage value from 9 V to 12 V, for example, 10 V, the voltage range changes and the resonant period needs to be detected. It may be understood that the direct current output voltage Vout may have a plurality of voltage ranges, and is not limited to two voltage ranges, and a boundary value of each voltage range is not limited to a value in the foregoing example.

In a possible implementation, for example, the voltage grouping unit 222 divides the direct current output voltage Vout into three levels. The direct current output voltage Vout may be divided into three levels: a high-voltage level HIGH, a middle-voltage level MIDDLE, and a low-voltage level LOW. Each level has two reference voltages. For example, the high-voltage level HIGH has a high-voltage first reference voltage VRH1 and a high-voltage second reference voltage VRH2. The high-voltage first reference voltage VRH1 is greater than the high-voltage second reference voltage VRH2.

For another example, the middle-voltage level MIDDLE has a middle-voltage first reference voltage VRM1 and a middle-voltage second reference voltage VRM2. The middle-voltage first reference voltage VRM1 is greater than the middle-voltage second reference voltage VRM2.

For another example, the low-voltage level LOW has a low-voltage first reference voltage VRL1 and a low-voltage second reference voltage VRL2. The low-voltage first reference voltage VRL1 is greater than the low-voltage second reference voltage VRL2.

In this embodiment, $VRH1>VRH2>VRM1>VRM2>VRL1>VRL2$.

It may be understood that, in this embodiment, the signal received by the voltage grouping unit 222 is the sampling signal Vsh provided by the sampling and holding unit 221. The sampling signal Vsh is proportional to the direct current output voltage Vout. In this way, a value of the sampling signal Vsh is determined and classified, to classify levels of the direct current output voltage Vout. As shown in FIG. 3, for example, when the value of the sampling signal Vsh changes from falling at the middle level MIDDLE to falling at the high level HIGH or the low level LOW, the voltage grouping unit 222 may determine that the level of the direct current output voltage Vout of the voltage conversion apparatus 200 changes, and further generate the first enable signal CS1 to the control unit 223. Similarly, when the level of the direct current output voltage Vout randomly is switched between the high-voltage level HIGH, the middle-voltage level MIDDLE, and the low-voltage level LOW, the voltage grouping unit 222 generates the first enable signal CS1 and sends the first enable signal CS1 to the control unit 223.

With reference to FIG. 2 again, it may be understood that the control unit 223 is connected to the second terminal of the voltage grouping unit 222. The control unit 223 is configured to receive the first enable signal CS1, and determine, based on the first enable signal CS1, that the direct current output voltage Vout changes. In addition, when the direct current output voltage Vout changes, running of the threshold timing unit 224 is controlled. In this way, the control unit 223 can trigger a threshold comparison function and a timing function of the threshold timing unit 224 when the level of the direct current output voltage Vout is switched in the voltage conversion apparatus 200, that is, when the voltage range of the direct current output voltage Vout changes, to obtain again the resonant period of the voltage conversion apparatus 200. In other words, as long as the level of the direct current output voltage Vout of the voltage conversion apparatus 200 is switched, a new resonant period may be adaptively obtained and the resonant period of the voltage conversion apparatus 200 is updated.

It may be understood that the sampling and holding unit 221 is disposed to receive a first sampling signal Vs1, and the voltage grouping unit 220 is used to group sampling signals Vsh output by the sampling and holding unit 221, to include the sampling signals Vsh into different voltage ranges, thereby monitoring the change of the direct current output voltage Vout of the voltage conversion apparatus 200.

The control unit 223 is further configured to receive the feedback voltage Vfb output by the output voltage sampling unit 230, and determine, based on the feedback voltage Vfb, that the voltage conversion apparatus 200 is in the first mode or the second mode. As described above, in the second mode, the first switching transistor S1 and the second switching transistor S2 have a continuous control state and a discontinuous control state. When the first switching transistor S1 and the second switching transistor S2 are in the discontinuous control state or are switched from the continuous state to the discontinuous control state (that is, at a discontinuous moment), the control unit 223 can generate a second enable signal. It may be understood that, because the control unit 223 is further configured to control turn-on and turn-off of the first switching transistor S1 and the second switching transistor S2, the control unit 223 can identify the continuous state and the discontinuous state, and a switching point (that is, at a discontinuous moment) of the two states, and generate the second enable signal in the discontinuous state or at the discontinuous moment.

It may be understood that the resonant period of the voltage conversion apparatus 200 needs to be detected when the voltage conversion apparatus 200 is in a free resonant state, that is, when both the first switching transistor S1 and the second switch S2 are turned off. Therefore, for the first mode and the second mode, the control unit 223 uses different policies to trigger the timing unit 224 to work, to detect the resonant period of the voltage conversion apparatus 200.

In the first mode, due to relatively heavy output load of the voltage conversion apparatus 200, the control unit 223 may need to perform continuous switching, that is, control the first switching transistor S1 and the second switching transistor S2 to be alternately turned on and turned off at a relatively high switching frequency. Therefore, when the resonant period needs to be detected, the first switching transistor S1 and the second switching transistor S2 need to be turned off, so that the voltage conversion apparatus 200 enters the free resonant state, thereby helping detect the resonant period.

In the second mode, due to relatively light output load of the voltage conversion apparatus 200, the control unit 223 does not need to perform continuous switching, that is, the first switching transistor S1 and the second switching transistor S2 are alternately turned on and turned off in a period of time (that is, in a continuous control state) and are both in a turn-off state in a next period of time (that is, in a discontinuous control state). Therefore, it is only necessary to detect the resonant period when both the first switching transistor S1 and the second switching transistor S2 are turned off (that is, in the discontinuous control state), without controlling the first switching transistor S1 and the second switching transistor S2 each to be turned off.

Accordingly, in a possible implementation, when the control unit 223 determines that the voltage conversion apparatus 200 is in the first mode, the control unit 223 can determine, based on the first enable signal CS1, the voltage range of the direct current output voltage Vout changes, to control the first switching transistor S1 and the second switching transistor S2 to be turned off and obtain the resonant period based on the second sampling voltage Vs2.

When the control unit 223 determines that the voltage conversion apparatus 200 is in the second mode, the control unit 223 can determine, based on the first enable signal, that the voltage range of the direct current output voltage Vout changes. When the voltage range of the direct current output voltage Vout changes and the voltage conversion apparatus 200 is switched from the continuous control state to the discontinuous control state, the resonant period is obtained based on the second sampling voltage Vs2. That the voltage conversion apparatus 200 is switched from the continuous control state to the discontinuous control state is determined by a second enable signal CS2 (with reference to FIG. 7).

It may be understood that determining the resonant period requires that the voltage conversion apparatus 200 is in the free resonant state. The voltage conversion apparatus 200 has different working modes (such as a first working mode and a second working mode). The resonant period is detected by using different policies in different modes, so that detection efficiency of the resonant period is improved.

The threshold timing unit 224 is configured to obtain the second sampling voltage Vs2, and determine the resonant period based on the second sampling voltage Vs2 when the voltage range of the direct current output voltage Vout changes.

The threshold timing unit 224 may include a comparator 2241 and a timer 2242. A first input terminal of the comparator 2241 is configured to receive a comparison voltage (such as the second sampling voltage Vs2). A second input terminal of the comparator 2241 is connected to a reference voltage Vref. The comparator 2241 generates a zero-crossing comparison signal ZCD based on a comparison result of the second sampling voltage Vs2 and the reference voltage Vref. After the threshold timing unit 224 (for example, a timer 2241) receives a timing trigger signal Ttri, the timer 2242 can determine the resonant period based on a period of the zero-crossing comparison signal ZCD.

It may be understood that the change of the direct current output voltage Vout reflects the resonant period of the voltage conversion apparatus 200, the second sampling voltage Vs2 represents the change of the direct current output voltage Vout, and the zero-crossing comparison signal ZCD is obtained based on the second sampling voltage Vs2. Therefore, the period of the zero-crossing comparison signal ZCD is obtained to determine the resonant period of the voltage conversion apparatus 200.

In a possible implementation, when the second sampling voltage Vs2 reaches the reference voltage Vref, that is, greater than or equal to the reference voltage Vref, a rising edge signal appears in the zero-crossing comparison signal ZCD output by the comparator 2241. When the second sampling voltage Vs2 is lower than the reference voltage Vref, a corresponding falling edge signal appears in the zero-crossing comparison signal ZCD output by the comparator 2241.

It may be understood that, as described above, the second sampling voltage Vs2 may be the same as the first sampling voltage Vs1. For example, as shown in FIG. 2, both the second sampling voltage Vs2 and the first sampling voltage Vs1 are connected between the resistor R1 and resistor R2.

In this embodiment, the reference voltage Vref is a zero voltage value. Further, in some other embodiments, the reference voltage Vref may also be any value greater than 0 or less than 0, as long as the voltage conversion apparatus 200 is in the free resonant state within a time period of detecting the resonant period (such as a time period from starting timing to ending timing by the timer 2242).

It may be understood that the time period of detecting the resonant period includes a first moment (for example, a start moment) and a second moment (for example, an end moment). In this embodiment, the timer 2242 performs timing by identifying the rising edge signal. When the timer 2242 identifies a first rising edge signal, that is, at the first moment, timing is triggered. When the timer 2242 identifies a second rising edge signal, that is, at the second moment, the timer 2242 ends timing and is reset.

The timer 2242 can determine the period of the zero-crossing comparison signal ZCD based on the first moment and the second moment, to determine the resonant period of the voltage conversion apparatus 200 and generate a resonant period signal Tc. In other words, based on a timing duration (that is, a time period between the first moment and the second moment) of the timer 2242, the resonant period of the voltage conversion apparatus 200 is obtained.

It may be understood that the resonant period is detected only when the level of the direct current output voltage Vout of the voltage conversion apparatus 200 changes, that is, when the voltage range of the direct current output voltage Vout changes. Therefore, the timer 2242 stops working after timing ends. That is, at a moment when a rising edge or a falling edge appears subsequently, timing is not triggered, until the level of the direct current output voltage Vout changes next time.

The threshold timing unit 224 can send the resonant period signal Tc to the control unit 223, and then the control unit 223 adjusts, based on the updated resonant period signal Tc, drive signals, such as the first drive signal Vgs1 used for controlling turn-on and turn-off of the first switching transistor S1 and the second drive signal Vgs2 used for controlling turn-on and turn-off of the second switching transistor S2.

It may be understood that timing of the timer 2242 only needs to be performed in a complete period of the zero-crossing comparison signal ZCD. That is, timing starts at a start point of a period and timing ends at an end point of the period. However, a timing start moment or a timing end moment is not limited. In this embodiment, the timer 2242 is disposed to trigger timing by a rising edge. In another embodiment, the timer 2242 may also be disposed to trigger timing by a falling edge. When the timer 2242 identifies a first falling edge signal, that is, at the first moment, timing is triggered. When the timer 2242 identifies a second falling edge, that is, at the second moment, the timer 2242 ends timing and is reset. It may be understood that, in some other implementations, a time between the first rising edge signal and the first falling edge signal may be detected, and twice the time is used as a period of the zero-crossing comparison signal ZCD or as a resonant period. Alternatively, twice the detected time between the first falling edge signal and the first rising edge signal is used as a period of the zero-crossing comparison signal ZCD or as a resonant period.

The control unit 223 can use the feedback voltage Vfb output by the output voltage sampling unit 230 to determine whether the voltage conversion apparatus 200 is in the first mode or the second mode. The sampling and holding unit 222 and the voltage grouping unit 222 can determine, based on the first sampling voltage Vs1, whether the voltage range of the output voltage of the voltage conversion apparatus 200 changes. The control unit 223 uses the different policies in the different modes to trigger the threshold timing unit 224 to determine the resonant period based on the second sampling voltage Vs2. The drive signals are adjusted based on the determined resonant period so that the conversion efficiency of the voltage conversion apparatus 200 is improved under a wide-range output.

In a possible implementation, the control unit 223 is further configured to: after receiving the resonant period signal Tc, generate an update completion signal Tf, and send the update completion signal Tf to the voltage grouping unit 222. After receiving the update completion signal Tf, the voltage grouping unit 222 pulls down the first enable signal CS1. That is, the first enable signal CS1 changes from a high-level state to a low-level state. After the first enable signal CS1 is pulled down or changed to the low-level state, the control unit 223 pulls down the update completion signal Tf. That is, the update completion signal Tf changes from a high-level state to a low-level state. The control unit 223 adjusts the drive signals based on the resonant period signal after the update completion signal Tf changes to the low-level state. This helps the first switching transistor S1 and the second switching transistor S2 continue to be alternately turned on based on the adjusted drive signals.

It may be understood that the update completion signal Tf indicates that the control unit 223 has received the resonant period signal Tc. The update completion signal Tf is introduced to enable the first enable signal CS1 to be reset (that is, changed to the low-level state), so that the first enable signal CS1 is generated again (changed to the high-level state) for identification when the level of the direct current output voltage Vout changes next time.

Optionally, the control circuit 220 in this embodiment can be integrated into a chip.

Figure 4:
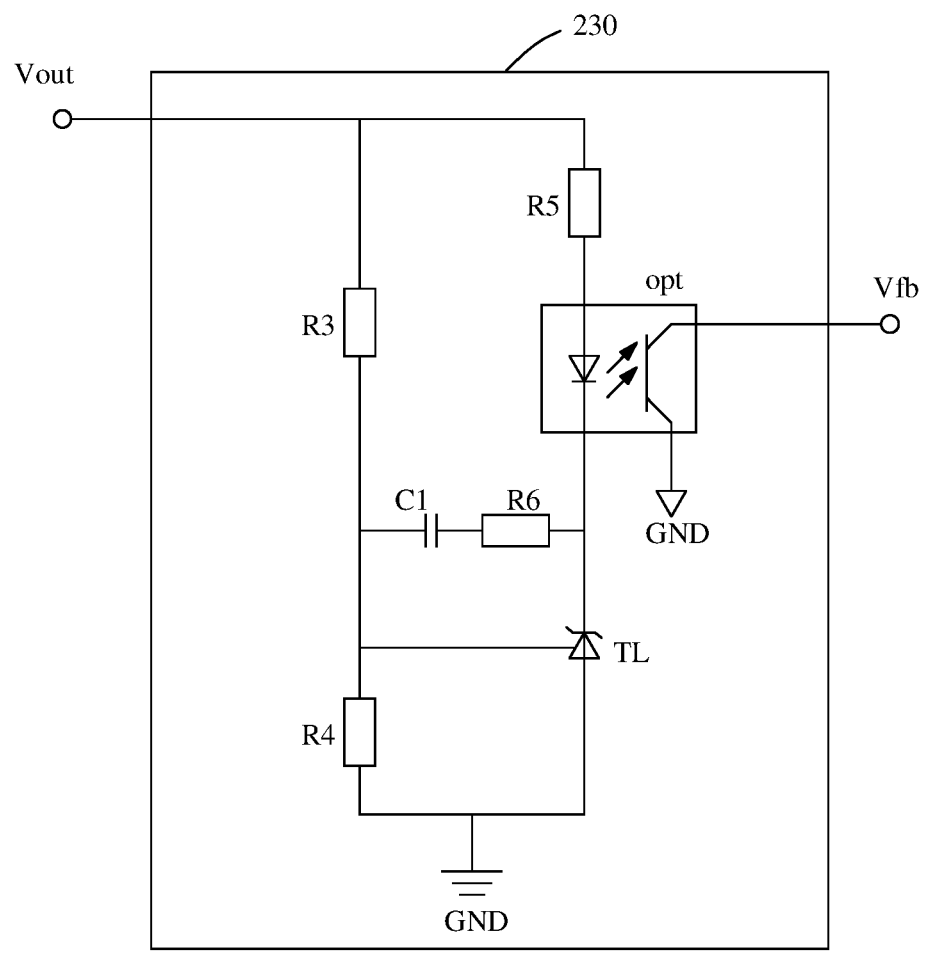
FIG. 4 is a schematic diagram of a structure of an output voltage sampling unit in the voltage conversion apparatus shown in FIG. 2.

FIG. 4 is a schematic diagram of a circuit of the output voltage sampling unit 230 according to an embodiment. As shown in FIG. 4, an input terminal of an output sampling circuit unit 230 is configured to receive the direct current output voltage Vout, and an output terminal is configured to output the feedback voltage Vfb.

The output voltage sampling unit 230 includes resistors R3 to R6, a capacitor C1, a controllable voltage regulator TL, and an optocoupler opt. A first terminal of the resistor R3 is connected to a first terminal of the resistor R5 and is configured to receive the direct current output voltage Vout. A second terminal of the resistor R3 is connected to a first terminal of the resistor R4, and a second terminal of the resistor R4 is connected to an anode of the controllable voltage regulator TL, and the second terminal of the resistor R4 and the anode of the controllable voltage regulator TL are jointly connected to ground GND. A reference terminal of the controllable voltage regulator TL is connected to a node between the resistor R3 and the resistor R4. A cathode of the controllable voltage regulator TL is connected to a first input terminal of the optocoupler opt. A second input terminal of the optocoupler opt is connected to a second terminal of the resistor R5. A first output terminal of the optocoupler opt is configured to output the feedback voltage Vfb. A second output terminal of the optocoupler opt is connected to ground GND. A first terminal of the capacitor C1 is connected to the node between the resistor R3 and the resistor R4. A second terminal of the capacitor C1 is connected to a first terminal of the resistor R6. A second terminal of the resistor R6 is connected to a node between the first input terminal of the optocoupler opt and the cathode of the controllable voltage regulator TL.

The resistor R3 and the resistor R4 are configured to perform voltage division on the direct current output voltage Vout. The controllable voltage regulator TL is configured to convert the direct current input voltage Vout into a current for driving the optocoupler opt. The capacitor C1 and the resistor R6 form a loop compensation circuit. The optocoupler opt refers to a device that transmits an electrical signal by using light as a medium, and is configured to implement sampling isolation between the primary side and the secondary side of the transformer Tr.

It should be understood that the output voltage sampling unit 230 in FIG. 4 is only used as an example rather than a limitation. The output voltage sampling unit 230 may also be implemented by using another circuit.

Figure 5:
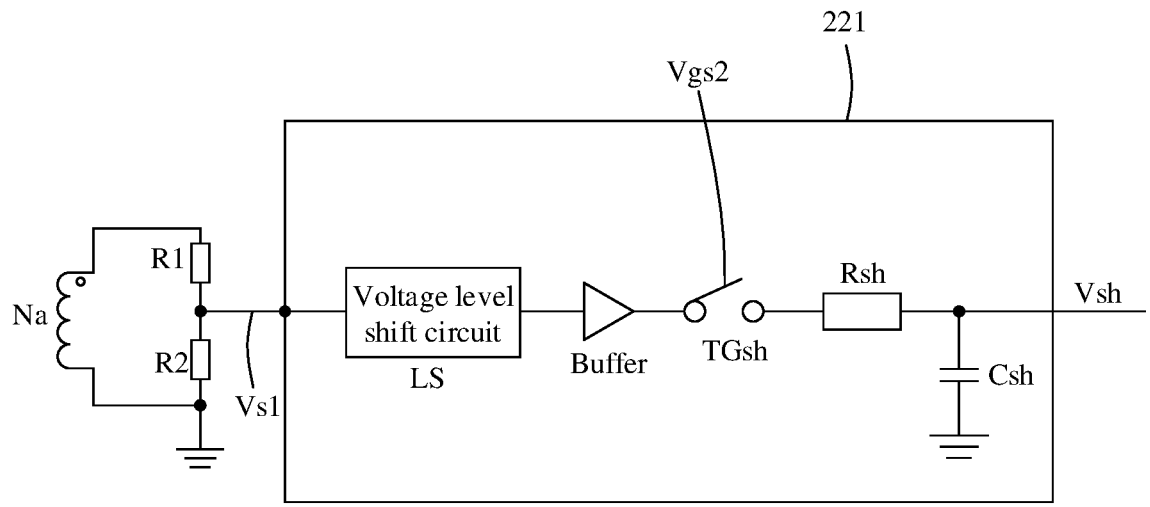
FIG. 5 is a schematic diagram of a sampling and holding unit in the voltage conversion apparatus shown in FIG. 2.

FIG. 5 is a schematic diagram of the sampling and holding unit 221 according to an embodiment. The sampling and holding unit 221 may include a voltage level shift circuit LS, a voltage buffer Buffer, a transmission gate TGsh, a holding resistor Rsh, and a holding capacitor Csh. A first terminal of the voltage level shift circuit LS is connected to a node between the resistor R1 and the resistor R2 and is configured to boost the first sampling voltage Vs1 to a positive voltage. A first terminal of the voltage buffer Buffer is connected to a second terminal of the voltage level shift circuit LS and is configured to improve a driving capability of the boosted voltage. A first terminal of the transmission gate TGsh is connected to a second terminal of the voltage buffer. A second terminal of the transmission gate TGsh is connected to a first terminal of the holding resistor Rsh. A second terminal of the holding resistor Rsh is connected to the voltage grouping unit 222 and is configured to output the sampling signal Vsh. A first terminal of the holding capacitor Csh is connected to a second terminal of the holding resistor Rsh. A second terminal of the holding capacitor Csh is connected to ground.

A third terminal of the transmission gate TGsh is configured to receive the second drive signal Vgs2. The transmission gate TGsh can be turned on and turned off under driving of the second drive signal Vgs2. In a possible implementation, when the second drive signal Vgs2 is at a high level, the second switching transistor S2 is turned on. In this case, the sampling and holding unit 221 is in a sampling state, the transmission gate TGsh is turned on, a circuit of the sampling and holding unit 221 is connected, the sampling capacitor Csh is charged by using a voltage output by the buffer, and the sampling signal Vsh at an output terminal follows the first sampling voltage Vs1 at an input terminal. When the second drive signal Vgs2 is at a low level, the second switching transistor S2 is turned off. In this case, the sampling and holding unit 221 is in a holding state, and a voltage value at a moment when the circuit is disconnected is kept for the sampling signal Vsh at the output terminal.

In this embodiment, the sampling signal Vsh is obtained through calculation of formula (1). Vsh is the sampling signal, Na represents a quantity of turns of the auxiliary winding, Ns represents a quantity of turns of the secondary winding, Vout is the direct current output voltage, $V_{LS}$ is a bias voltage of the voltage level shift circuit LS, and k is a proportional coefficient.

$$\text{Vout} = k \cdot \frac{R2}{R1+R2} \cdot \frac{Na}{Ns} \cdot \text{Vout} + V_{LS} \qquad \text{Formula (1)}$$

It should be understood that the sampling and holding unit 221 in FIG. 5 is only used as an example rather than a limitation. The sampling and holding unit 221 may also be implemented by using another circuit.

Figure 6:
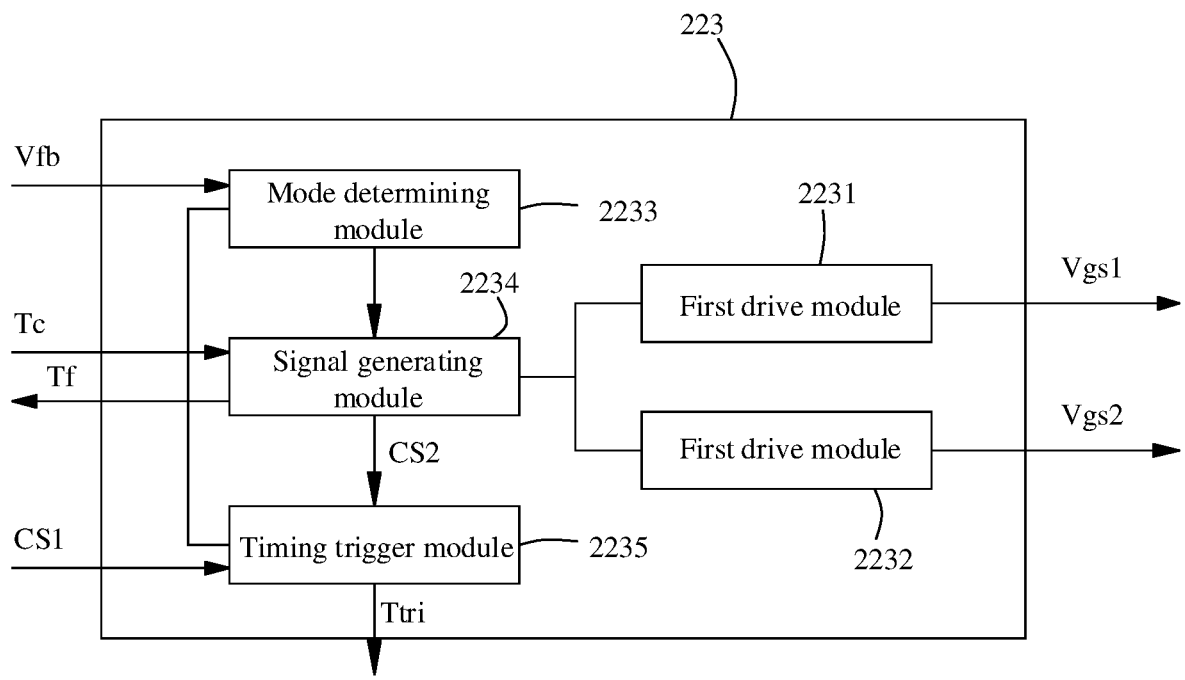
FIG. 6 is a schematic diagram of a module of a control unit in the voltage conversion apparatus shown in FIG. 2.

FIG. 6 is a schematic diagram of the control unit 223 according to an embodiment. The control unit 223 includes a first drive module 2231, a second drive module 2232, a mode determining module 2233, a signal generating module 2234, and a timing trigger module 2235.

The first drive module 2231 is connected to a gate of the first switching transistor S1 and is configured to provide the first drive signal $V_{GS1}$, to control turn-on or turn-off of the first switching transistor S1.

The second drive module 2232 is connected to a gate of the second switching transistor S2 and is configured to provide the second drive signal $V_{GS2}$, to control turn-on or turn-off of the second switching transistor S2.

The mode determining module 2233 is connected to the output voltage sampling unit 230 to receive the feedback voltage Vfb. The mode determining module 2233 is configured to determine, based on the feedback voltage Vfb, whether the voltage conversion apparatus 200 is currently in the first mode or in the second mode.

The signal generating module 2234 is connected to the first drive module 2231, the second drive module 2232, and the mode determining module 2233. The signal generating module 2234 is configured to: when the voltage conversion apparatus 200 is in the second mode, further determine, based on the first drive signal Vgs1 and the second drive signal Vgs2 that are output by the first drive module 2231 and the second drive module 2232, whether the voltage conversion apparatus 200 is in the discontinuous control state or in the continuous control state; and generate the second enable signal CS2 when it is determined that the voltage conversion apparatus 200 is switched from the continuous control state to the discontinuous control state (that is, at the discontinuous moment) or is in the discontinuous control state. When the voltage conversion apparatus 200 is in the second mode and is at the discontinuous moment or in the discontinuous control state, the signal generating module 2234 can generate the second enable signal CS2.

The timing trigger module 2235 is connected to the signal generating module 2234. When the mode determining module 2233 determines that the voltage conversion apparatus 200 is in the first mode, the timing trigger module 2235 generates the trigger signal Ttri based on the first enable signal CS1 generated by the voltage grouping unit 222. When the mode determining module 2233 determines that the voltage conversion apparatus 200 is in the second mode, the timing trigger module 2235 generates the trigger signal Ttri based on the first enable signal CS1, and the second enable signal CS2 that is generated by the signal generating module 2234. When receiving the trigger signal Ttri, the threshold timing unit 114 enables the threshold comparison function and the timing function.

In a possible implementation, the signal generating module 2234 is further configured to: after obtaining the resonant period signal Tc, generate the update completion signal Tf. The update completion signal Tf can be sent to the voltage grouping unit 222. The voltage grouping unit 222 can reset the first enable signal CS1 after receiving that the update completion signal Tf is pulled up, that is, after the update completion signal Tf changes from a low level to a high level.

It may be understood that, in some other implementations, the second enable signal CS2 and the update completion signal Tf may be implemented by different modules. That is, the signal generating module 2234 is only configured to generate the second enable signal CS2 while the update completion signal Tf is implemented by another module (not shown in the figure).

Figure 7:
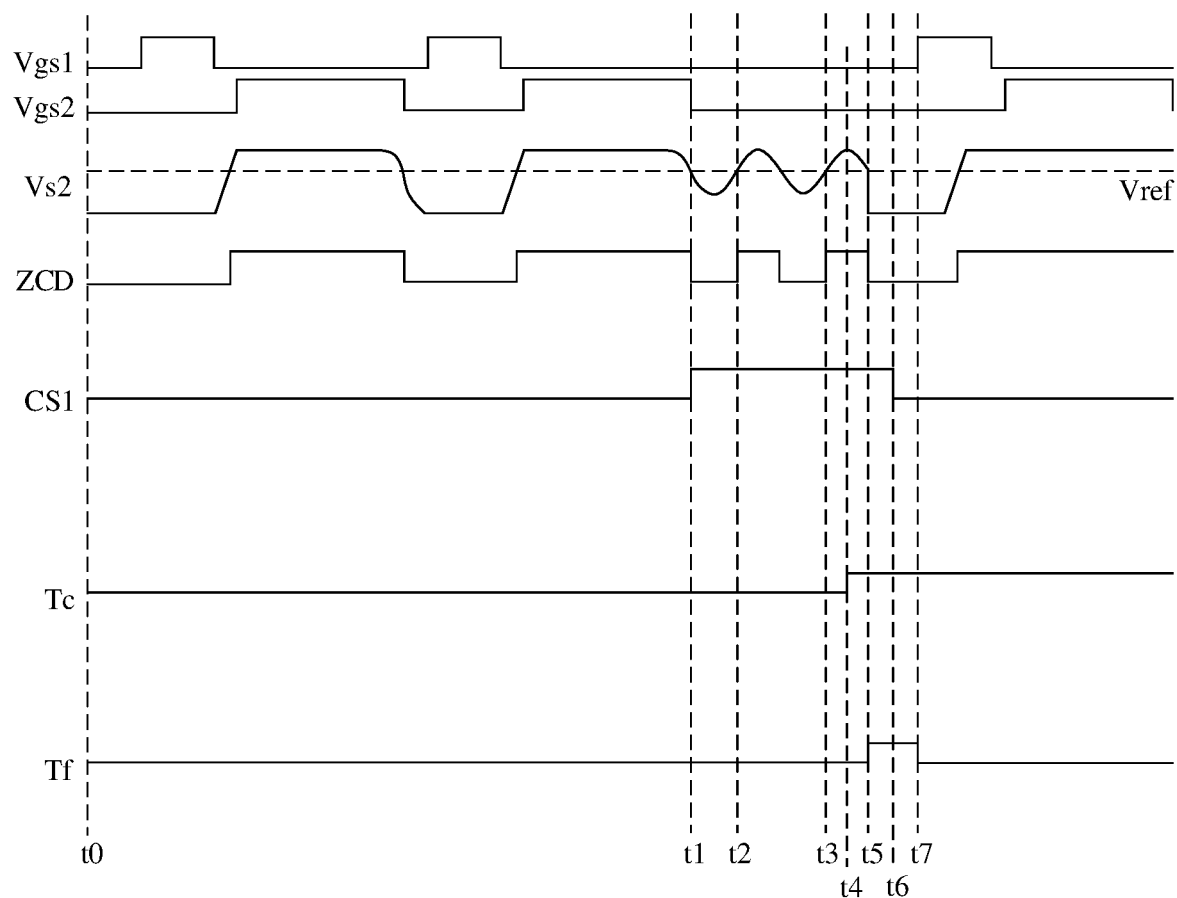
FIG. 7 is a diagram of working waveforms of a voltage conversion apparatus in a first mode according to Embodiment 1.

FIG. 7 is a schematic diagram of working waveforms of the voltage conversion apparatus 200 in the first mode. A working principle of the voltage conversion apparatus 200 in the first mode is as follows.

Between t0 and t1, due to relatively heavy load of the voltage conversion apparatus 200 in the first mode, the first switching transistor S1 and the second switching transistor S2 need to be continuously switched. Therefore, the first drive signal Vgs1 and the second drive signal Vgs2 need to be continuously and alternately switched between high and low levels. After the first drive signal Vgs1 is switched from a high level to a low level, the second drive signal Vgs2 is switched from a low level to a high level; and after the second drive signal Vgs2 is switched again from a high level to a low level, the first drive signal Vgs1 is switched again from a low level to a high level.

At the moment t1, when the level of the direct current output voltage Vout of the voltage conversion apparatus 200 is switched, the first enable signal CS1 generated by the voltage grouping unit 222 is pulled up and then output to the timing trigger module 2235.

At moments t1 to t2, the first drive module 2231 and the second drive module 2232 of the control unit 223 each control the first switching transistor S1 and the second switching transistor S2 to be turned off. In this way, the voltage conversion apparatus 200 starts to enter the free resonant state. The timing trigger module 2235 generates the trigger signal Ttri, with reference to the signal that is sent by the mode determining mode 2233 when the voltage conversion apparatus 200 is in the first mode, and the pulled-up first enable signal CS1, and sends the trigger signal Ttri to the threshold timing unit 224. The timer 2242 waits for the rising edge signal of the comparator 2241 to start timing.

At the moment t2, the second sampling voltage Vs2 is greater than or equal to the reference voltage Vref, and a rising edge appears in the zero-crossing comparison signal ZCD generated by the comparator 2241. The timer 2242 starts timing.

At moments t2 to t3, the timer 2242 continues timing.

At the moment t3, a rising edge appears again in the zero-crossing comparison signal ZCD generated by the comparator 2241, the timer 2242 ends timing, the resonant period is obtained based on the timing duration, and the resonant period signal Tc including the resonant period is transmitted to the control unit 223.

At moments t3 to t4, after obtaining the resonant period signal Tc, the control unit 223 updates the resonant period of the voltage conversion apparatus 200.

At the moment t4, the resonant period is updated.

At moments t4 to t5, the control unit 223 generates the update completion signal Tf and sends the update completion signal Tf to the voltage grouping unit 222.

At the moment t5, the update completion signal Tf is pulled up.

At moments t5 to t6, after the voltage grouping unit 222 receives that the update completion signal Tf is pulled up, the first enable signal CS1 is reset.

At the moment t6, the first enable signal CS1 is reset, that is, pulled down.

At moments t6 to t7, after the first enable signal CS1 is pulled down and reset, the control unit 223 restores the first switching transistor S1 and the second switching transistor S2 to be turned on.

At the moment t7, the update completion signal Tf is pulled down. In addition, after the update completion signal Tf changes to the low-level state, the control unit 223 adjusts the drive signals ($V_{GS1}$ and $V_{GS2}$) based on the resonant period signal, so that the first switching transistor S1 and the second switching transistor S2 continue to be alternately turned on based on the adjusted switch drive signals.

Figure 8:
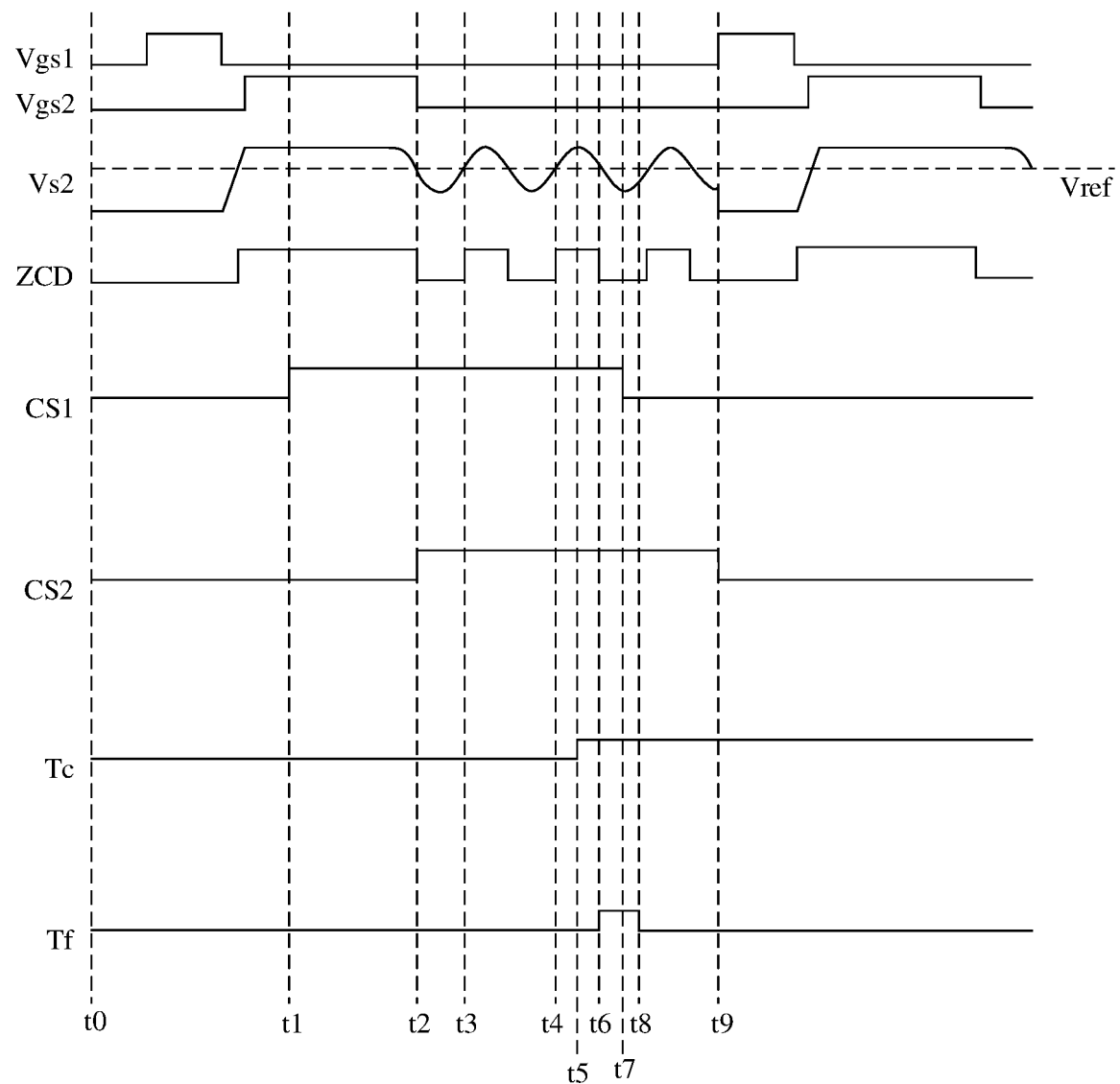
FIG. 8 is a diagram of working waveforms of a voltage conversion apparatus in a second mode according to Embodiment 1.

FIG. 8 is a schematic diagram of working waveforms of the voltage conversion apparatus 200 in the second mode. A working principle of the voltage conversion apparatus 200 in the second mode is as follows.

At moments t0 to t1, after the first drive signal Vgs1 and the second drive signal Vgs2 are alternately switched between high and low levels for a period of time, that is, after the voltage conversion apparatus 200 is in the continuous control state, the first drive signal Vgs1 and the second drive signal Vgs2 are both in the low-level state for a period of time, that is, in the discontinuous control state for a period of time.

It may be understood that, in the time period of the discontinuous control state, the first switching transistor S1 and the second switching transistor S2 are both in the turn-off state. In this case, the voltage conversion apparatus 200 is already in the free resonant state. Therefore, the control unit 223 does not need to perform a turn-off operation separately in the second mode to detect the resonant period.

At the moment t1, when the level of the direct current output voltage Vout of the voltage conversion apparatus 200 is switched, the first enable signal CS1 generated by the voltage grouping unit 222 is pulled up and output to the timing trigger module 2235.

At moments t1 to t2, the control unit 223, for example, the timing trigger module 2235, continuously identifies the high and low states of the second enable signal CS2. If the second enable signal CS2 is in the low-level state, the control unit 223 waits for the second enable signal CS2 to be in the high-level state.

At the moment t2, the second enable signal CS2 reaches the high-level state, and the timing trigger module 2235 generates the trigger signal Ttri and sends the trigger signal Ttri to the threshold timing unit 224.

It may be understood that, in the second mode, the first switching transistor S1 and the second switching transistor S2 are both in the turn-off state in the period of time. The control unit 223, for example, the signal generating module 2234, only needs to wait to generate the second enable signal CS2 in the discontinuous control state, for example, at the discontinuous moment, such as the moment t2, which is a moment when the continuous control state starts to switch to the discontinuous control state, so that the timing trigger module 2235 sends the trigger signal Ttri to the threshold timing unit 224 to trigger timing.

At moments t2 to t3, after the threshold timing unit 224 receives the trigger signal Ttri generated by the timing trigger module 2235, the timer 2242 waits for a rising edge signal of the comparator 2241 to start timing. At the moment t3, the second sampling voltage Vs2 is greater than or equal to the reference voltage Vref, and a rising edge appears in the zero-crossing comparison signal ZCD generated by the comparator 2241. The timer 2242 starts timing.

At moments t3 to t4, the timer 2242 continues timing. At the moment t4, a rising edge appears again in the zero-crossing comparison signal ZCD generated by the comparator 2241, the timer 2242 ends timing, the resonant period is obtained based on the timing duration, and the resonant period signal Tc including the resonant period is transmitted to the control unit 223.

At moments t4 to t5, after obtaining the resonant period signal Tc, the control unit 223 updates the resonant period of the voltage conversion apparatus 200.

At the moment t5, the resonant period is updated.

At moments t5 to t6, the control unit 223 generates the update completion signal Tf and sends the update completion signal Tf to the voltage grouping unit 222.

At the moment t6, the update completion signal Tf is pulled up.

At moments t6 to t7, after the voltage grouping unit 222 receives the update completion signal Tf is pulled up, the first enable signal CS1 is reset.

At the moment t7, the first enable signal CS1 is reset, that is, pulled down.

At moments t7 to t8, after the first enable signal CS1 is pulled down and reset, the control unit 223 resets the update completion signal Tf.

At moments t8 to t9, after the update completion signal Tf is pulled down and reset, the control unit 223 waits for ending of the discontinuous control state.

At the moment t9, the discontinuous control state ends, the second enable signal CS2 is pulled down, and the first drive signal VGS1 and the second drive signal VGS2 continue to alternately switch between the high and low levels.

Embodiment 2

Figure 9:
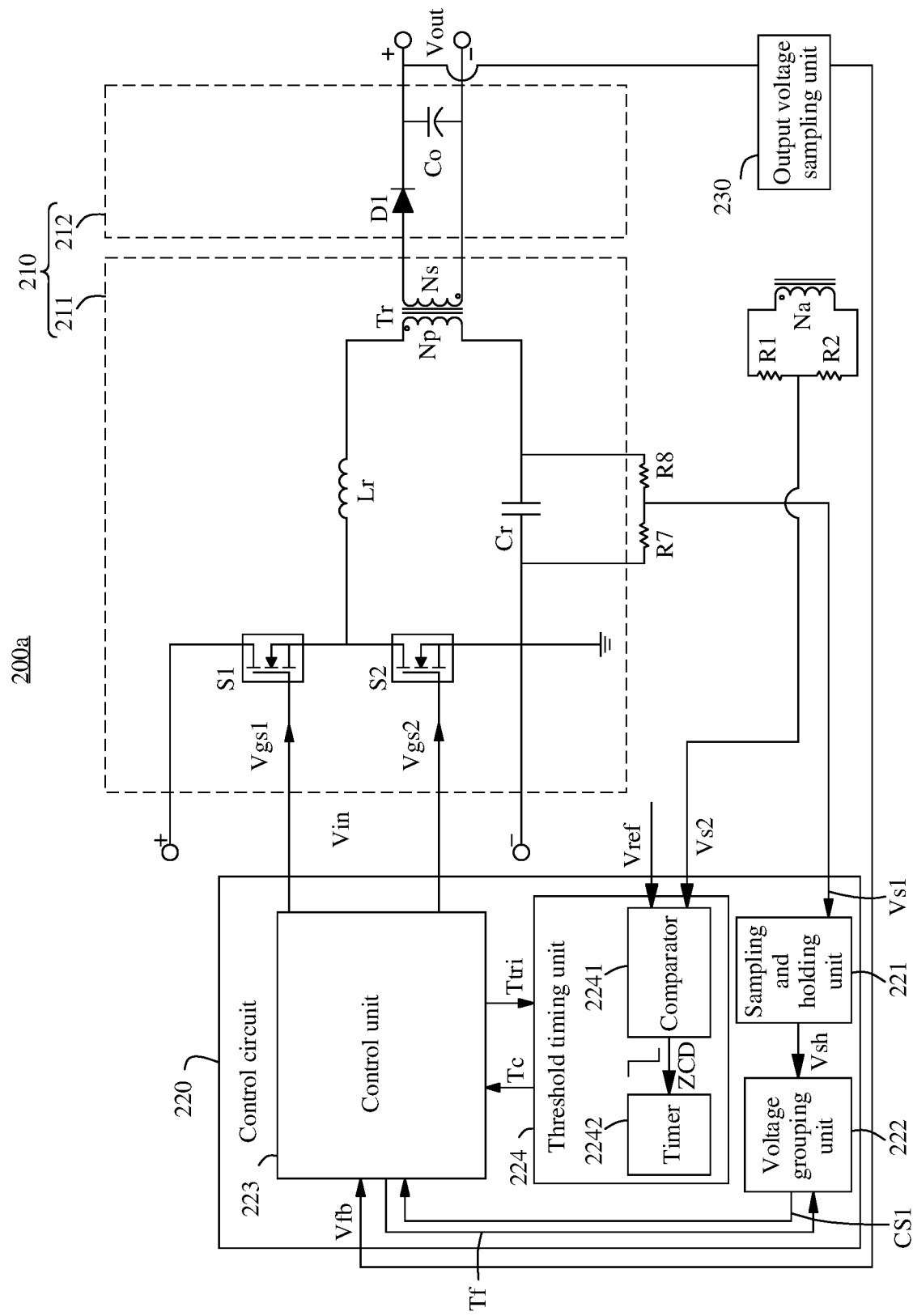
FIG. 9 is a schematic diagram of a structure of a voltage conversion apparatus according to Embodiment 2.

FIG. 9 is a schematic diagram of a voltage conversion apparatus 200*a* according to Embodiment 2. In this embodiment, the voltage conversion apparatus 200a includes an asymmetrical half-bridge conversion unit 210, a control circuit 220, and an output voltage sampling unit 230. The control circuit 210 includes a sampling and holding unit 221, a voltage grouping unit 222, a control unit 223, and a threshold timing unit 224. The threshold timing unit 224 includes a comparator 2241 and a timer 2242.

It may be understood that, in Embodiment 2, structures of the asymmetrical half-bridge conversion unit 210, the control circuit 220, and the output voltage sampling unit 230, and structures of the sampling and holding unit 221, the voltage grouping unit 222, the control unit 223, and the threshold timing unit 224 are basically the same as those in Embodiment 1, and the only difference lies in that the first sampling voltage Vs1 is different from the second sampling voltage Vs2.

Accordingly, for the second sampling voltage Vs2, the comparator 2241 is still connected to a node between a resistor R1 and a resistor R2 and is configured to obtain the second sampling voltage Vs2. For the first sampling voltage Vs1, the voltage conversion apparatus 200a includes sampling resistors R7 and R8. The sampling resistors R7 and R8 are connected in parallel at two terminals of a resonant capacitor Cr. An input terminal of the sampling and holding unit 221 is connected between the sampling resistors R7 and R8. It may be understood that a voltage at the two terminals of the resonant capacitor Cr may be sampled by the sampling and holding unit 221 after being divided by the sampling resistors R7 and R8, to obtain the first sampling voltage Vs1.

It may be understood that the voltage at two terminals of the resonant capacitor Cr has a proportional relationship with a direct current input voltage Vout. Therefore, collecting the voltage at the two terminals of the resonant capacitor Cr can achieve a same effect as collecting a voltage at two terminals of an auxiliary winding Na.

Embodiment 3

Figure 10:
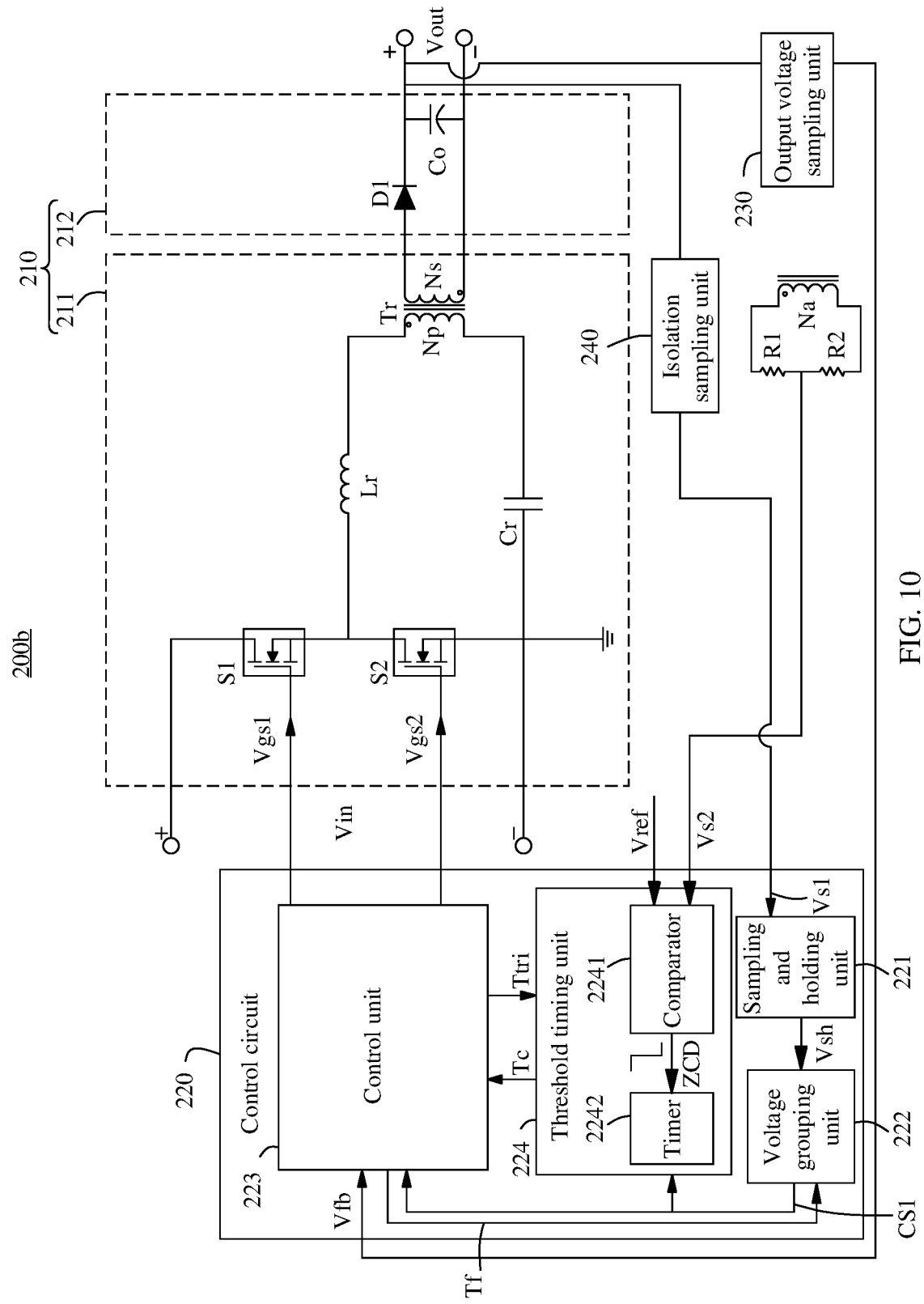
FIG. 10 is a schematic diagram of a structure of a voltage conversion apparatus according to Embodiment 3.

FIG. 10 is a schematic diagram of a voltage conversion apparatus 200b according to Embodiment 3. In this embodiment, the voltage conversion apparatus 200b includes an asymmetrical half-bridge conversion unit 210, a control circuit 220, and an output voltage sampling unit 230. The control circuit 210 includes a sampling and holding unit 221, a voltage grouping unit 222, a control unit 223, and a threshold timing unit 224. The threshold timing unit 224 includes a comparator 2241 and a timer 2242.

It may be understood that, in Embodiment 3, structures of the asymmetrical half-bridge conversion unit 210, the control circuit 220, and the output voltage sampling unit 230, and structures of the sampling and holding unit 221, the voltage grouping unit 222, the control unit 223, and the threshold timing unit 224 are basically the same as those in Embodiment 1, and the only difference lies in that the first sampling voltage Vs1 is different from the second sampling voltage Vs2.

Accordingly, for the second sampling voltage Vs2, the comparator 2241 is still connected to a node between a resistor R1 and a resistor R2 and is configured to obtain the second sampling voltage Vs2.

For the first sampling voltage Vs1, the voltage conversion apparatus 200b includes an isolation sampling unit 240. One terminal of the isolation sampling unit 240 is connected to an output terminal of the asymmetrical half-bridge conversion unit 210 and is configured to receive a direct current output voltage Vout and convert the direct current output voltage Vout into the first sampling voltage Vs1. An input terminal of the sampling and holding unit 221 is connected to the other terminal of the isolation sampling unit 240, to receive the first sampling voltage Vs1.

In Embodiment 3, a structure of the isolation sampling unit 240 is not limited. For example, a structure that is the same as that of the output voltage sampling unit 230 may be used.

The isolation sampling unit 240 may directly collect the direct current output voltage Vout and obtains the first sampling voltage Vs1, which may achieve a same effect as collecting a voltage at two terminals of an auxiliary winding Na.

Embodiment 4

Figure 11:
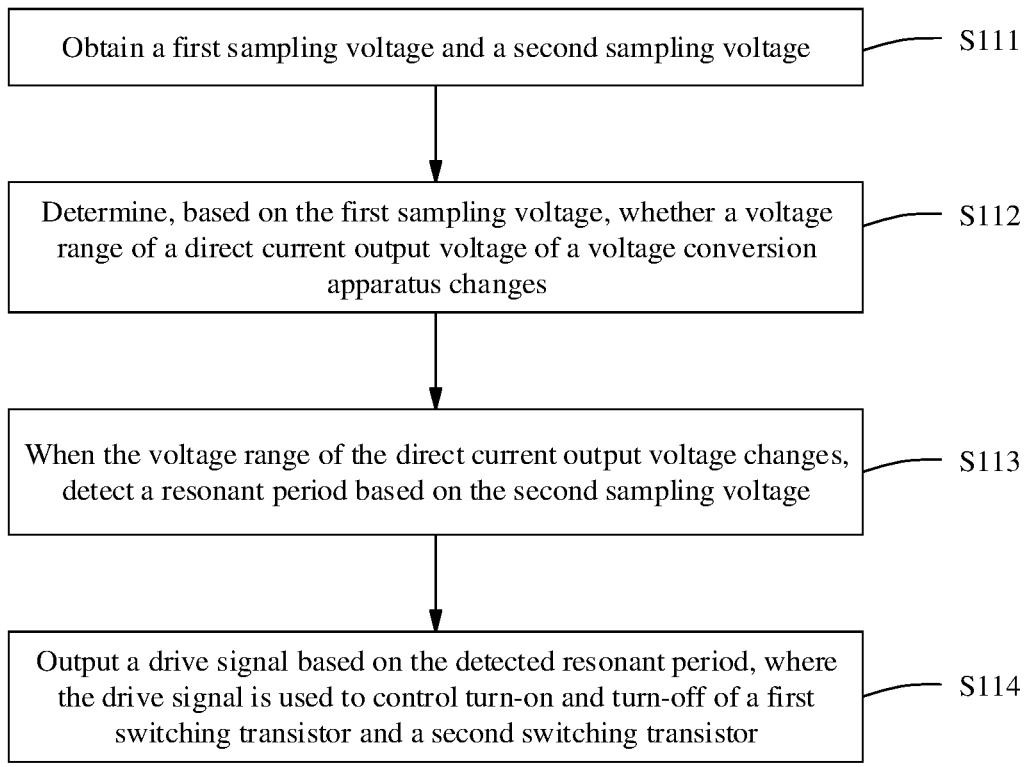
FIG. 11 is a schematic flowchart of a control method of a voltage conversion apparatus according to an embodiment.

As shown in FIG. 11, an embodiment may further provide a control method of a voltage conversion apparatus, which applies to the voltage conversion apparatus 200/200a/200b in the foregoing embodiments. For ease of description, an example in which the control method applies to the voltage conversion apparatus 200 shown in FIG. 2 is used. As shown in FIG. 11, the control method of the voltage conversion apparatus includes the following steps.

S111: A control circuit 220 obtains a first sampling voltage Vs1 and a second sampling voltage Vs2.

It may be understood that, as shown in FIG. 2, the control circuit 220 may obtain the first sampling voltage Vs1 and the second sampling voltage Vs2 by using the auxiliary winding Na, the first resistor R1, and the second resistor R2. For a working principle of the control circuit 220, refer to FIG. 2 and related descriptions thereof. Details are not described herein again.

S112: The control circuit 220 determines, based on the first sampling voltage Vs1, whether a voltage range of a direct current output voltage Vout of the voltage conversion apparatus 200 changes.

It may be understood that the control circuit 220 determines, based on the first sampling voltage Vs1, when a resonant period of the voltage conversion apparatus 200 needs to be detected. For descriptions, refer to FIG. 2 and related descriptions thereof. Details are not described herein again.

S113: When the voltage range of the direct current output voltage Vout changes, the control circuit 220 detects the resonant period based on the second sampling voltage Vs2.

It may be understood that, when the resonant period of the voltage conversion apparatus 200 needs to be detected, the control circuit 220 can detect and obtain the resonant period by using the second sampling voltage Vs2. For descriptions, refer to FIG. 2 and related descriptions thereof. Details are not described herein again.

S114: Output a drive signal based on the detected resonant period, where the drive signal is used to control turn-on and turn-off of a first switching transistor and a second switching transistor.

A change of the direct current output voltage Vout may be monitored, the resonant period of the voltage conversion apparatus 200/200a/200b may be adaptively detected and updated, and then the drive signal may be adjusted based on the updated resonant period, so that conversion efficiency of the voltage conversion apparatus 200/200a/200b is improved under a wide-range output.

Embodiment 5

Figure 12:
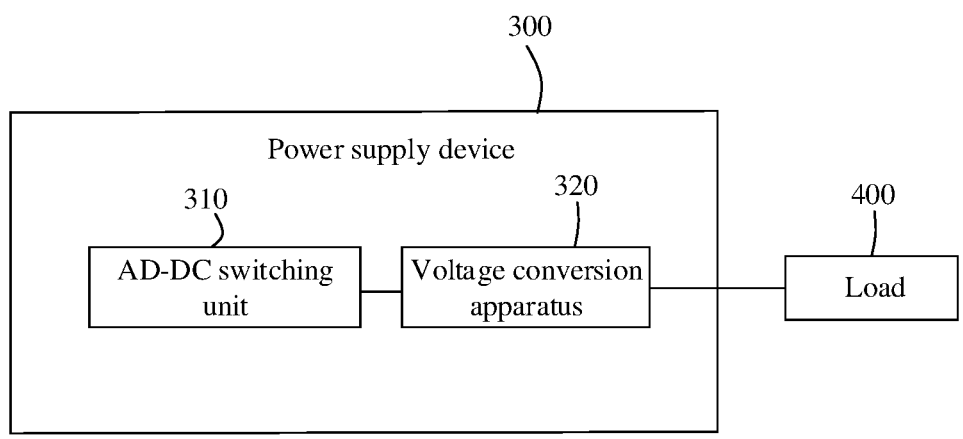
FIG. 12 is a schematic diagram of a structure of a power supply device according to an embodiment.

FIG. 12 is a schematic diagram of a structure of a power supply device 300 according to Embodiment 5. The power supply device 300 may supply power to a load 400. The load 400 may include, but is not limited to, a personal computer, a mobile phone, a computer, a television display, and the like.

In a possible implementation, the power supply device 300 is an AC-DC (AC-DC) conversion system. The power supply device 300 includes an AC-DC conversion unit 310 and a DC-DC voltage conversion apparatus 320. The AC-DC conversion unit 310 is configured to convert an alternating current voltage into a direct current voltage and output the direct current voltage to the voltage conversion apparatus 320. It may be understood that the voltage conversion apparatus 320 in this embodiment may be any one of the voltage conversion apparatus 200/200a/200b in the foregoing embodiments. Details are not described herein again.

In another possible implementation, the power supply device 300 may also be a DC-DC conversion system. Accordingly, the power supply device 300 includes the DC-DC voltage conversion apparatus 320, configured to convert a direct current input voltage into a direct current output voltage.

The foregoing descriptions are only implementations, but the scope of the embodiments is not limited thereto. Any variation or replacement readily figured out by a person skilled in the art shall fall within the scope of the embodiments.

What is claimed is:

1. A voltage conversion apparatus, having a resonant period, the voltage conversion apparatus comprising:
   an asymmetrical half-bridge conversion unit; and
   a control circuit, the asymmetrical half-bridge conversion unit comprising a first switching transistor and a second switching transistor, wherein
   the control circuit is configured to:
   obtain a first sampling voltage and a second sampling voltage;
   detect the resonant period based on the second sampling voltage when it is determined, based on the first sampling voltage, that a voltage range of an output voltage of the voltage conversion apparatus changes; and
   output a drive signal based on the detected resonant period, wherein the drive signal is used to control turn-on and turn-off of the first switching transistor and the second switching transistor.

2. The voltage conversion apparatus according to claim 1, wherein the control circuit further comprises:
   a sampling and holding unit configured to sample and hold the first sampling voltage, and output a sampling signal;
   a voltage grouping unit configured to receive the sampling signal, and generate a first enable signal when it is determined, based on the sampling signal, that the voltage range of the output voltage changes; and
   a control unit configured to determine, based on the first enable signal, that the voltage range of the output voltage changes.

3. The voltage conversion apparatus according to claim 2, wherein the control circuit further comprises:
   a threshold timing unit configured to obtain the second sampling voltage and determine the resonant period based on the second sampling voltage when the control unit determines that the voltage range of the output voltage changes.

4. The voltage conversion apparatus according to claim 3, wherein the threshold timing unit further comprises:

a comparator configured to obtain the second sampling voltage and a reference voltage, and output a comparison signal; and
   a timer configured to determine the resonant period based on a period of the comparison signal.

5. The voltage conversion apparatus according to claim 2, wherein the voltage conversion apparatus comprises a first mode and a second mode, the first mode is a continuous resonance current mode, the second mode is a discontinuous resonance current mode, the second mode comprises a continuous control state and a discontinuous control state, and in the discontinuous control state, both the first switching transistor and the second switching transistor are in a turn-off state; the voltage conversion apparatus comprises an output voltage collection unit, and the output voltage collection unit is configured to receive the output voltage and output a feedback voltage; and
   the control unit is further configured to:
   obtain the feedback voltage;
   determine, based on the feedback voltage, that the voltage conversion apparatus is in the first mode or in the second mode;
   control the first switching transistor and the second switching transistor to be turned off and obtain the resonant period based on the second sampling voltage, when it is determined that the voltage conversion apparatus is in the first mode and the voltage range of the output voltage changes; and
   obtain the resonant period based on the second sampling voltage when it is determined that the voltage conversion apparatus is in the second mode and the voltage range of the output voltage changes, and the voltage conversion apparatus is switched from the continuous control state to the discontinuous control state.

6. The voltage conversion apparatus according to claim 1, wherein the asymmetrical half-bridge conversion unit further comprises:
   a transformer that comprises a primary winding and a secondary winding, and the second sampling voltage is a voltage at two terminals of one of the primary winding and the secondary winding.

7. The voltage conversion apparatus according to claim 6, wherein the transformer further comprises:
   an auxiliary winding coupled to the primary winding, and the second sampling voltage is a voltage at two terminals of the auxiliary winding.

8. The voltage conversion apparatus according to claim 6, wherein the first sampling voltage and the second sampling voltage are a same voltage.

9. The voltage conversion apparatus according to claim 6, wherein the asymmetrical half-bridge conversion unit further comprises:
   a resonant capacitor; and the first sampling voltage is a voltage at two terminals of the resonant capacitor.

10. The voltage conversion apparatus according to claim 6, further comprising:
    an isolation sampling unit configured to receive the output voltage, wherein the first sampling voltage is a voltage output by the isolation sampling unit.

11. A control method of a voltage conversion apparatus having a resonant period and comprising an asymmetrical half-bridge conversion unit and a control circuit, and the asymmetrical half-bridge conversion unit comprising a first switching transistor and a second switching transistor, and the method comprises:
    obtaining a first sampling voltage and a second sampling voltage;

detecting the resonant period based on the second sampling voltage when it is determined, based on the first sampling voltage, that a voltage range of an output voltage of the voltage conversion apparatus changes; and outputting a drive signal based on the detected resonant period, wherein the drive signal is used to control turn-on and turn-off of the first switching transistor and the second switching transistor.

12. The control method according to claim 11, comprising:

sampling and holding the first sampling voltage, and outputting a sampling signal;

receiving the sampling signal, and generating a first enable signal when it is determined, based on the sampling signal, that the voltage range of the output voltage changes; and determining, based on the first enable signal, that the voltage range of the output voltage changes.

13. The control method according to claim 12, comprising:

obtaining the second sampling voltage and a reference voltage, and outputting a comparison signal; and determining the resonant period based on a period of the comparison signal.

14. The control method according to claim 12, wherein the voltage conversion apparatus comprises a first mode and a second mode, the first mode is a continuous resonance current mode, the second mode is a discontinuous resonance current mode, the second mode comprises a continuous control state and a discontinuous control state, and in the discontinuous control state, both the first switching transistor and the second switching transistor are in a turn-off state; the voltage conversion apparatus comprises an output voltage collection unit, and the output voltage collection unit is configured to receive the output voltage and output a feedback voltage; and the method further comprises:

obtaining the feedback voltage;

determining, based on the feedback voltage, that the voltage conversion apparatus is in the first mode or in the second mode;

controlling the first switching transistor and the second switching transistor to be turned off and obtaining the resonant period based on the second sampling voltage, when it is determined that the voltage conversion apparatus is in the first mode and the voltage range of the output voltage changes; and obtaining the resonant period based on the second sampling voltage when it is determined that the voltage conversion apparatus is in the second mode and the voltage range of the output voltage changes, and the voltage conversion apparatus is switched from the continuous control state to the discontinuous control state.

15. A power supply device, comprising:

an alternating current-direct current (AC-DC) voltage conversion unit configured to convert an alternating current voltage into a direct current input voltage; and a voltage conversion apparatus configured to receive the direct current input voltage output by the AC-DC voltage conversion unit, and output a direct current output voltage after direct current voltage conversion, wherein the voltage conversion apparatus has a resonant period and comprises an asymmetrical half-bridge conversion unit and a control circuit; the asymmetrical half-bridge conversion unit comprises a first switching transistor and a second switching transistor; and the control circuit is configured to: obtain a first sampling voltage and a second sampling voltage; detect the resonant period based on the second sampling voltage when it is determined, based on the first sampling voltage, that a voltage range of an output voltage of the voltage conversion apparatus changes; and output a drive signal based on the detected resonant period, wherein the drive signal is used to control turn-on and turn-off of the first switching transistor and the second switching transistor.

* * * * *